(12) United States Patent
Tatekawa et al.

(10) Patent No.: US 7,418,724 B2
(45) Date of Patent: Aug. 26, 2008

(54) APPARATUS FOR CHANGING MULTIPLE MEDIA DISKS

(75) Inventors: Tsutomu Tatekawa, Iwaki (JP); Tokio Suzuki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 610 days.

(21) Appl. No.: 11/124,426

(22) Filed: May 6, 2005

(65) Prior Publication Data

US 2005/0249100 A1 Nov. 10, 2005

(30) Foreign Application Priority Data

May 10, 2004 (JP) .............................. 2004-139368

(51) Int. Cl.
*G11B 21/02* (2006.01)
*G11B 33/02* (2006.01)
*G11B 7/00* (2006.01)
(52) U.S. Cl. ...................... 720/673; 720/662; 720/667; 720/690; 720/657; 369/30.81
(58) Field of Classification Search ................. 720/657, 720/662, 673, 690, 667; 369/30.77, 30.78, 369/30.81, 30.88, 30.89
See application file for complete search history.

(56) References Cited

U.S. PATENT DOCUMENTS

| | | | | |
|---|---|---|---|---|
| 4,403,316 A | * | 9/1983 | van de Veerdonk | 720/662 |
| 4,408,311 A | * | 10/1983 | Suzuki et al. | 369/43 |
| 4,574,372 A | * | 3/1986 | d'Alayer de Costemore d'Arc | 720/673 |
| 4,794,586 A | * | 12/1988 | Korth | 720/662 |
| 5,117,413 A | * | 5/1992 | Van Rosmalen et al. | 720/662 |
| 5,398,230 A | * | 3/1995 | Han | 720/667 |
| 5,631,894 A | * | 5/1997 | Takahashi | 720/667 |
| 5,790,509 A | * | 8/1998 | Noguchi | 720/662 |
| 6,567,369 B2 | * | 5/2003 | Yoshida et al. | 369/184 |
| 7,093,269 B2 | * | 8/2006 | Murotani | 720/605 |
| 2002/0036976 A1 | * | 3/2002 | Michimori et al. | 369/192 |
| 2003/0198147 A1 | * | 10/2003 | Watanabe et al. | 369/30.85 |
| 2004/0111731 A1 | * | 6/2004 | Suzuki et al. | 720/624 |
| 2005/0114878 A1 | * | 5/2005 | Nishida et al. | 720/676 |
| 2005/0235298 A1 | * | 10/2005 | Fujiwara | 720/619 |
| 2006/0053431 A1 | * | 3/2006 | Nakade et al. | 720/662 |

FOREIGN PATENT DOCUMENTS

| | | | | |
|---|---|---|---|---|
| JP | 10003729 A | * | 1/1998 | |
| JP | H10-003729 | | 1/1998 | |
| JP | 11162079 A | * | 6/1999 | |
| JP | H11-162079 | | 6/1999 | |

* cited by examiner

*Primary Examiner*—Brian E Miller
(74) *Attorney, Agent, or Firm*—Brinks Hofer Gilson & Lione

(57) ABSTRACT

A disk changer apparatus includes a rotation base on which a turntable and a head are mounted. The rotation base can rotate about the rear end thereof as a fulcrum. The disk changer apparatus further includes a base supporter opposed to the top end of the rotation base when the rotation base moves to a driving position where the rotation base can drive a disk selected from a plurality of disks, a lock member movably mounted on the rotation base, and a lock control mechanism for causing the lock member to be connected to the base supporter when the rotation base moves to the driving position. The disk changer apparatus having such a structure stably supports both ends of the rotation base when the rotation base rotates to the driving position.

25 Claims, 20 Drawing Sheets

APPARATUS FOR CHANGING MULTIPLE MEDIA DISKS

BACKGROUND OF THE INVENTION

1. Field of the Invention

The present invention relates to a disk changer apparatus capable of storing a plurality of disks, such as compact disks (CDs) and digital versatile disks (DVDs), in a case and selecting one of the disks to drive it.

2. Description of the Related Art

Disk changer apparatuses are used as, for example, in-car disk apparatuses, in which a plurality of disks are stacked in the thickness direction and are stored in a case. When a user selects one of the disks, the selected disk is rotated to read and/or record information.

Such a disk changer apparatus includes a plurality of disk supporters for holding the disks, a disk selection mechanism for moving one of the disk supporters to a selected position, a rotation base which has a turntable and a head and which is rotatable, in a case, about a rear end thereof as a fulcrum, a driving mechanism for rotating the rotation base between a driving position and a standby position, and a disk transport mechanism for transporting a disk inserted into a disk insertion port on the case to the disk supporter and ejecting the disk from the disk supporter to the disk insertion port. Here, the driving position is a position where the center of a disk held by a disk supporter located at the selected position or a disk pulled out from the disk supporter is aligned with the center of the turntable, and the standby position is a position where the rotation base does not overlap the disk supported by the disk supporter.

To properly clamp a selected disk on the turntable of the rotation base and reliably carry out playback and recording of information in the disk by the head, the rotation base needs to be precisely positioned at the driving position. Also, a vibration-proof structure is required to prevent vibration caused by, for example, a moving vehicle from being transmitted to the rotation base via the case.

To precisely position the rotation base, a disk apparatus such as is disclosed, for example, in Japanese Unexamined Patent Application Publication No. 10-003729 has been known. The disk apparatus disclosed in Japanese Unexamined Patent Application Publication No. 10-003729 includes a rotation arm (rotation base) which has a turntable and a head and which rotates about a rear end thereof as a fulcrum (a first fulcrum). The disk apparatus further includes a link which rotates about a rear end thereof as a fulcrum (a second fulcrum). The top end of the link is connected to the rotation base by a pin (a third fulcrum). When the rotation arm moves from the standby position to the driving position, the link rotates while following the rotation arm. When the rotation arm reaches the driving position, the rotation arm is properly positioned by the first, second, and third fulcrums. Furthermore, two positioning tabs are provided to a disk holder in a disk holding unit. The two positioning tabs pinch the top end of the rotation arm when a disk held by the disk holder is mounted on the turntable so as to determine the position of the rotation arm.

On the other hand, Japanese Unexamined Patent Application Publication No. 11-162079, for example, discloses a disk apparatus having a vibration-proof structure for the rotation base. In the disk apparatus disclosed in Japanese Unexamined Patent Application Publication No. 11-162079, a swing arm which rotates between a driving position and a standby position and a drive arm which also rotates between the driving position and the standby position are coaxially aligned and are rotatably mounted on a support part resiliently supported by two vibration dampers provided in a case. A turntable and a head are mounted on this drive arm. Another vibration damper is attached to an end of the swing arm. The drive arm is supported by the swing arm via the vibration damper. When a disk is clamped on the turntable, the drive arm is resiliently supported by the three vibration dampers, namely, the two dampers for resiliently supporting the support part and the vibration damper attached to the swing arm.

In the disk apparatus disclosed in Japanese Unexamined Patent Application Publication No. 10-003729, the position of the rotation base rotated to the driving position is determined by three points using the link. At the same time, two positioning tabs provided to a disk supporter limit the movement of the rotation base in the vertical direction (in the thickness direction of a disk).

However, in the disk apparatus disclosed in Japanese Unexamined Patent Application Publication No. 10-003729, the link is always connected to the rotation base and rotates with the rotation base. Accordingly, the structure is complicated. Also, to precisely position the rotation base at the driving position, the positions of three fulcrums need to be precisely determined. This requires high precision machining and assembly, thus increasing the manufacturing cost.

Additionally, two positioning tabs formed on the disk supporter limit the position of the rotation base in the vertical direction. These positioning tabs are required to be provided to all of the disk supporters in the case. This further increases the cost.

In the disk apparatus disclosed in Japanese Unexamined Patent Application Publication No. 11-162079, three vibration dampers are disposed between a case and a rotation base to prevent vibrations from being transmitted via the case.

However, when the rotation base rotates to the driving position, positioning of the top end of the rotation base, on which a turntable is mounted, is not precisely determined. Therefore, when a disk clamped on the turntable is driven to rotate, vibration tends to occur at the end of the rotation base.

Furthermore, in the disk apparatus disclosed in Japanese Unexamined Patent Application Publication No. 11-162079, the damper arranged in the vicinity of the turntable is not secured to the case, but is mounted to the end of the swing arm, which rotates about the base end thereof as a fulcrum on the case. Accordingly, if vibration is transmitted to the case, the swing arm also receives the vibration. This vibration tends to be transmitted to the rotation base having the turntable and the head.

SUMMARY OF THE INVENTION

Accordingly, it is an object of the present invention to provide a disk changer apparatus for reliably positioning a top end of a rotation base when the rotation base rotates to a driving position and for increasing the vibration-proof effect.

According to the present invention, a disk changer apparatus includes, in a case thereof, a plurality of disk supporters, each of which holds a disk. The disk supporters are stacked in the thickness direction of the disk. The disk changer apparatus further includes a disk selection mechanism for moving the plurality of disk supporters in the thickness direction of the disk and placing one of the disk supporters at a selected position, a rotation base including a turntable and a head and being rotatable about the rear end portion thereof as a fulcrum, and a driving mechanism for rotating the rotation base between a driving position and a standby position, wherein the driving position is a position where one of the centers of the disk supported by the disk supporter located at the selected position or the disk pulled out from the disk supporter located at the selected position is aligned with the center of the turntable, and the standby position is a position where the rotation base does not overlap the disk supported by the disk supporter. The disk changer apparatus further includes a lock member movably mounted on the rotation base, a base supporter opposed to the top end of the rotation base when the rotation base moves to the driving position, and a lock control mechanism for causing the lock member to be connected to the base supporter when the rotation base moves to the driving position.

The rotation base has a cantilever structure so that the rotation base rotates about the rear end thereof as a fulcrum. By connecting the base supporter mounted on the case to the front end (free end) of the rotation base using the lock member, both ends of the rotation base can be stably supported while maintaining the precise positioning of the rotation base.

Preferably, in such a structure, the base supporter is located at a position where the base supporter is capable of passing through the center hole of the disk supported by the disk supporter other than the disk supporter located at the selected position.

This structure allows the base supporter to be disposed in a disk holding area. Accordingly, a space inside the case can be efficiently utilized. In addition, the disk supporters moving in the thickness direction of a disk and the disks held by the disk supporters do not interfere with the base supporter.

With this structure, when the lock member is connected to the base supporter and the disk is driven to rotate by the turntable, the base supporter can be resiliently supported by a resilient member in the case.

This structure prevents vibrations from being transmitted to the rotation base via the case. Accordingly, a vibration-proof effect can be increased for the rotation base having a turntable and a head.

Preferably, in such a structure, the rotation base includes a thread mechanism for reciprocally moving the head along a surface of the disk and the lock control mechanism causes the lock member to be connected to the base supporter or causes the lock member to be released from the base supporter in accordance with the head moved by a moving force of the thread mechanism.

This structure eliminates the need for a dedicated driving source for causing the lock member to be connected to the base supporter or for causing the lock member to be released from the base supporter. Accordingly, the manufacturing cost can be reduced.

With this structure, the lock member can be biased by a spring in a direction to be connected to the base supporter and, when the head moves in one of the reciprocal directions, the lock member can be moved by the moving force of the head in a direction to release the connection with the base supporter against the biasing force of the spring.

More specifically, the lock member can be mounted on the rotation base such that the lock member is slidably movable in the same moving direction as the head, the lock member includes a pressing blade extending into a moving area of the head, and the head urges against the pressing blade so as to move the lock member in a direction to release the connection with the base supporter.

Thus, the lock member is moved by a moving force of the head when the head moves while facing the innermost or outermost periphery area of the disk. Since this area is not an information recording area, the connection between the lock member and the base supporter can be released without adversely affecting information playback and recording operations.

Preferably, in such a structure, a center axis of the base supporter is substantially coaxially aligned with a rotational center axis of the turntable when the lock member is connected to the base supporter.

This structure allows the rotation base to be supported by the base supporter while the top end of the rotation base is connected to the base supporter at a position near the rotational center axis of the turntable. Accordingly, the turntable and a disk driven to rotate by the turntable do not tilt. As a result, the information playback and recording operations can be reliably carried out.

Preferably, in such a structure, a recess portion is formed on one of the top end of the rotation base and the base supporter, a protrusion fittable to the recess portion is formed on the other of the top end of the rotation base and the base supporter, and, when the rotation base rotates to the driving position, the base supporter moves close to the rotation base so that the recess portion fits to the protrusion.

This structure allows a recess portion on the top end of the rotation base to fit to a protrusion of the base supporter when the rotation base is located at the driving position. Accordingly, the movement of the rotation base in a direction to return to the standby position can be reliably prevented.

In this structure, the base supporter can move close to the rotation base by the moving force of the lock member in a direction to be connected with the base supporter.

For example, by allowing the top end of the rotation base to vertically move in the direction of a disk and providing a cam mechanism for converting the moving force of the lock member to a moving force of the top end of the rotation base, the base supporter can move close to the rotation base or move away from the rotation base without providing a dedicated driving source.

According to the present invention, when a rotation base on which a turntable and a head are mounted rotates about the rear end thereof as a fulcrum, a disk changer apparatus can reliably determine the position of the top end (free end) of the rotation base so as to stably support the top end of the rotation base.

DESCRIPTION OF THE PREFERRED EMBODIMENTS

The overall structure of a disk changer apparatus according to a first embodiment of the present invention will be described next.

Figure 1:
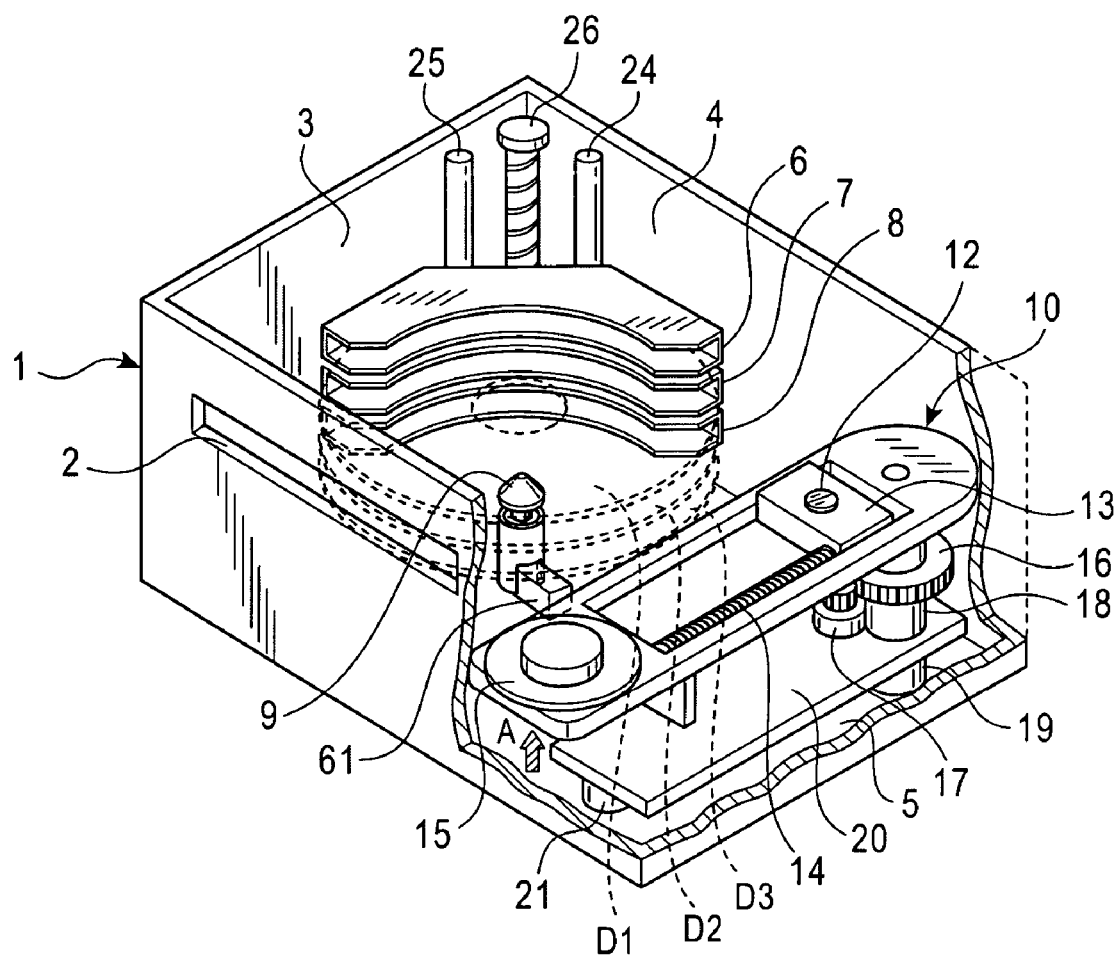
FIG. 1 is a perspective view partly in section illustrating a disk changer apparatus according to a first embodiment of the present invention when a rotation base is located at a standby position.

As shown in FIG. 1, a disk changer apparatus has a disk insertion port 2, which is a slit in a case 1. Disks are inserted into the disk insertion port 2 one by one. Three disks may be stored in the case 1. However, it should be noted that more than three disks also may be stored in the case 1. Additionally, FIG. 1 is a partially sectional view of the case 1 for illustrating an internal structure of the case 1. However, in practice, the case 1 is sealed by a top panel, a bottom panel, and four side panels.

Figure 2:
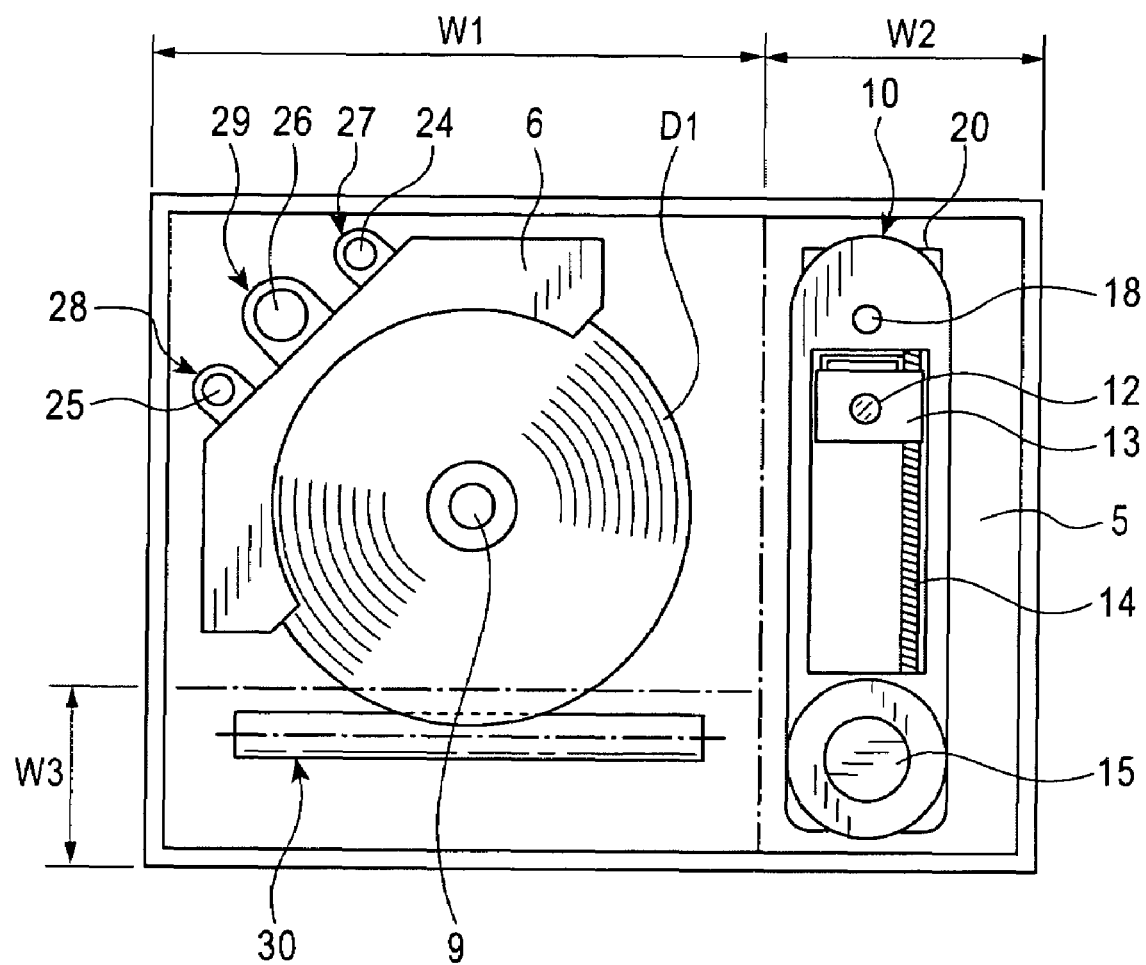
FIG. 2 is a plan view of the disk changer apparatus shown in FIG. 1.

As shown in FIG. 2, the interior of the disk changer apparatus can be separated into three areas for the later description. The disk changer apparatus includes a disk storage area W1 in which a plurality of disk supporters is arranged, a standby area W2 in which a rotation base is standing by, and an area W3 in which a disk loading unit is disposed.

First, the disk storage area W1 will be described. As shown in FIG. 1, a disk supporter unit disposed in the disk storage area W1 includes three disk supporters 6, 7, and 8. The three disk supporters 6, 7, and 8 can support three disks D1, D2, and D3 shown by a dotted line, respectively. The disk supporters 6, 7, and 8 are stacked in the thickness direction of the disks (i.e., vertical direction). A pair consisting of guide shafts 24 and 25 is disposed at a corner defined by a left side panel 3 and a back panel 4 of the case 1 and is vertically fixed to a bottom panel 5. Each of the disk supporters 6, 7, and 8 has a pair of flanges 27 and 28, as shown in FIG. 2. A hole is formed in each of the flanges 27 and 28. The guide shafts 24 and 25 are disposed in the holes formed in the flanges 27 and 28, respectively. The disk supporters 6, 7, and 8 are slidably guided by the guide shafts 24 and 25 so as to move in the vertical direction.

As shown in FIG. 1, a variable-pitch lead screw 26 is disposed between the guide shafts 24 and 25. The variable-pitch lead screw 26 is vertically fixed to the bottom panel 5 at the corner defined by the left side panel 3 and the back panel 4 of the case 1. The variable-pitch lead screw 26 is also supported by the bottom panel 5 so as to rotate in the clockwise direction or in the counterclockwise direction. The pitch of the thread groove of the variable-pitch lead screw 26 is wide at the center area in the axis (vertical) direction and is narrow at both end areas in the axis direction. As shown in FIG. 2, a flange 29 is joined to each of the disk supporters 6, 7, and 8 between the flanges 27 and 28. The variable-pitch lead screw 26 is inserted into and installed at a hole formed in the flange 29. The inner surface of the hole has an engagement protrusion which engages with the thread groove of the variable-pitch lead screw 26. As the variable-pitch lead screw 26 is rotated by a motor (not shown), the disk supporters 6, 7, and 8 move up and down in the axis direction of the guide shafts 24 and 25 (i.e., the thickness direction of the disks D1, D2, and D3).

A disk selection mechanism is composed of the variable-pitch lead screw 26, the flanges 27, 28, and 29 of the respective disk supporter 27, 28, and 29, the guide shafts 24 and 25, and the motor for rotating the variable-pitch lead screw 26 so as to move one of the disk supporters supporting a desired one of a plurality of disks D1, D2, and D3 to the selected position.

As shown in FIG. 1, the disk insertion port 2 is formed in a front panel of the case 1 as a slit. When a user inputs an instruction signal to select one of the disk supporters 6, 7, and 8, the variable-pitch lead screw 26 rotates so that the selected supporter is moved to the selected position opposed to the disk insertion port 2. When a position sensor (not shown) detects that the selected supporter reaches the selected position, the rotation of the motor in the disk selection mechanism stops so as to stop the movement of the disk supporter at the selected position.

The disk supporter stopped at the selected position is located at a position in a wider pitch area of the variable-pitch lead screw 26, whereas a disk supporter beneath the disk supporter is located at a lower position in a narrower pitch area of the variable-pitch lead screw 26. Therefore, a space is formed between the disk supporter at the selected position and the non-selected disk supporter beneath the selected disk supporter in the vertical direction. When a rotation base 10 rotates towards a driving position shown in FIG. 9, the rotation base 10 moves in the space between the disk supporter stopped at the selected position and another disk supporter beneath the disk supporter. The rotation base 10 is described below.

The selected position is not limited to a position opposed to the disk insertion port 2. Alternatively, the selected position may be a position slightly higher or lower than the disk insertion port 2. A disk supporter located above the selected disk supporter is stopped at an upper position in a narrower pitch area of the variable-pitch lead screw 26. Therefore, a space is also formed between the disk supporter at the selected position and the disk supporter above the selected disk supporter in the vertical direction.

Figure 3:
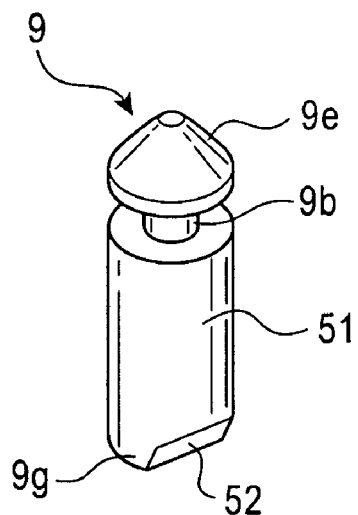
FIGS. 3, 4, and 5 are perspective views illustrating the structure of a base supporter.

As shown in FIG. 1, a base supporter 9 is fixed to the bottom panel 5 of the case 1. The base supporter 9 is made from synthetic resin or metal. As shown in FIG. 3, the base supporter 9 is formed as a shaft. The base supporter 9 has a tapered head 9e, which is a convex superior portion used for fitting purposes, a lock shaft 51 having the same diameter as the maximum diameter of the tapered head 9e, and a small-diameter portion 9b located between the tapered head 9e and the lock shaft 51. The small-diameter portion 9b has a diameter smaller than that of the tapered head 9e or the lock shaft 51, and has a predetermined height in its axis direction (vertical direction).

Figure 4:
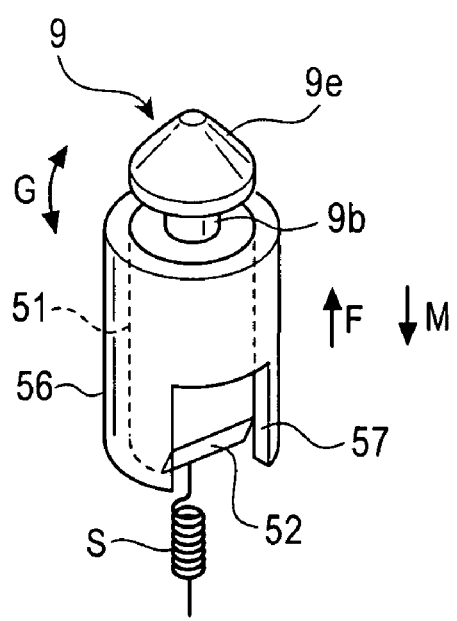

A tubular shaft holder 56 as shown in FIG. 4 is fixed to the bottom panel 5 of the case 1. The lock shaft 51 of the base supporter 9 is supported by the shaft holder 56. The lock shaft 51 is slidably movable in the shaft holder 56 in its axis direction (vertical direction: F and M directions). To prevent the lock shaft 51 in the shaft holder 56 from rotating in G direction, a rotation preventing structure is provided in which either one of the lock shaft 51 and the shaft holder 56 has a key groove (not shown) and the other has a protrusion to fit to the key groove. A spring S is disposed between the base supporter 9 and the bottom panel 5 of the case 1. The elastic force of the spring S always pulls the base supporter 9 downward (in M direction).

Figure 5:
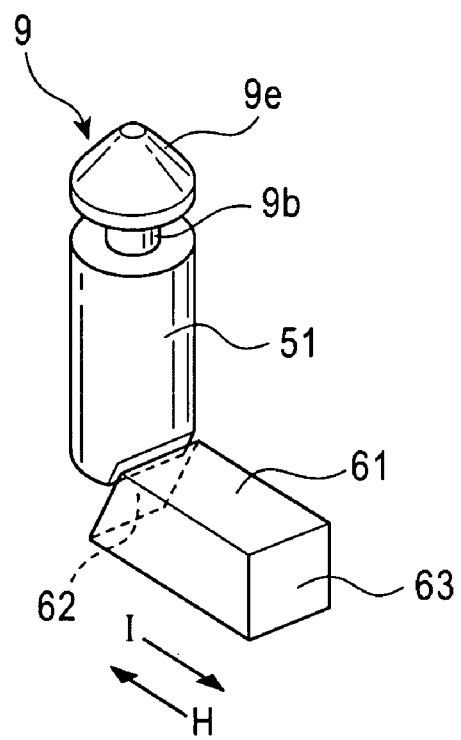
Figure 6:
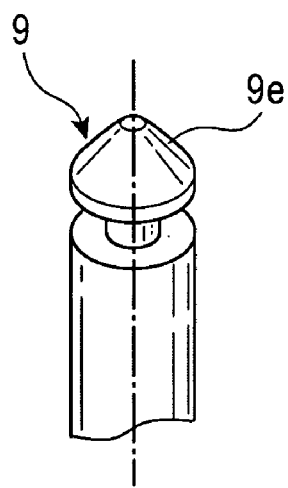
FIG. 6 is a partial perspective view of a preferable shape of the top end of the base supporter.

As shown in FIGS. 3 and 4, the bottom end of the lock shaft 51 has a slope portion 52, which gradually reduces the thickness of the lock shaft 51 as the slope portion 52 slopes towards the bottom end of the lock shaft 51. Also, a push lever 61 shown in FIG. 5 is mounted on the bottom panel 5 of the case 1. The push lever 61 is freely slidable along the bottom panel 5 in the horizontal direction (H or I direction). The top end of the push lever 61 in the H direction has a slope portion 62. One end of the slope portion 62 can move into the shaft holder 56 through a window 57 formed in the shaft holder 56.

When the push lever 61 moves in the H direction, the slope portion 52 slides on the slope portion 62, and therefore, the base supporter 9 is raised in the F direction (upward direction). In contrast, when the push lever 61 moves back in the I direction, the base supporter 9 is lowered by the biasing force of the spring S in the M direction (downward direction).

Figure 9:
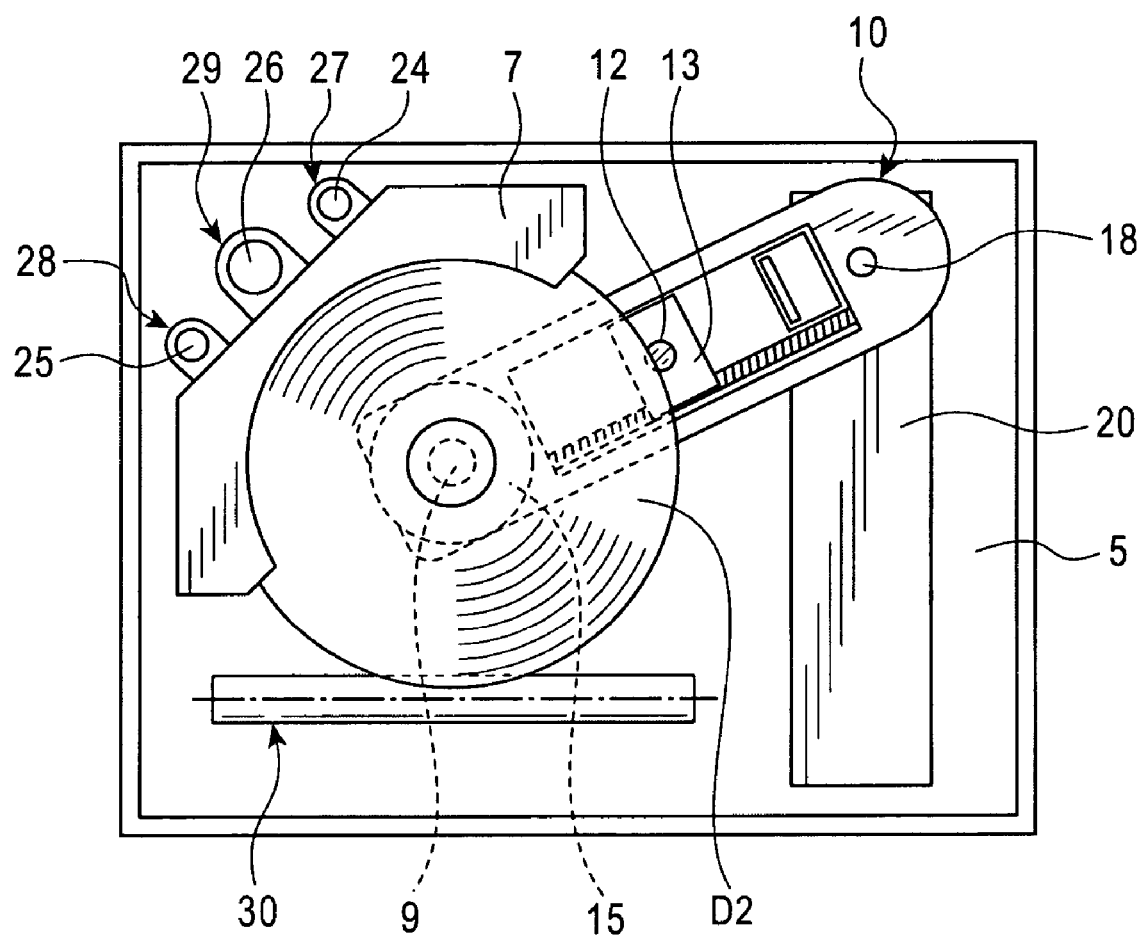
FIG. 9 is a plan view of the disk changer apparatus when the rotation base rotates to a driving position.
Figure 10:
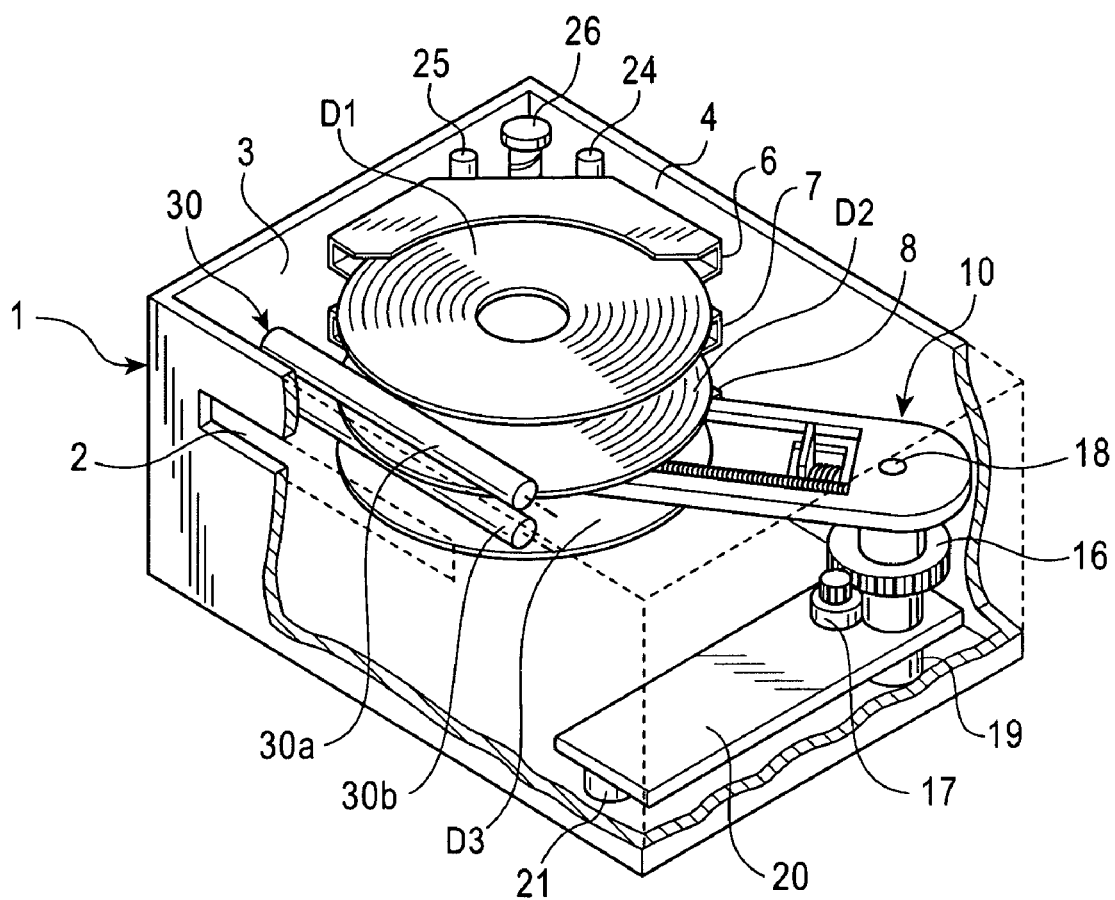
FIG. 10 is a perspective view of the disk changer apparatus when the rotation base rotates to the driving position.
Figure 12:
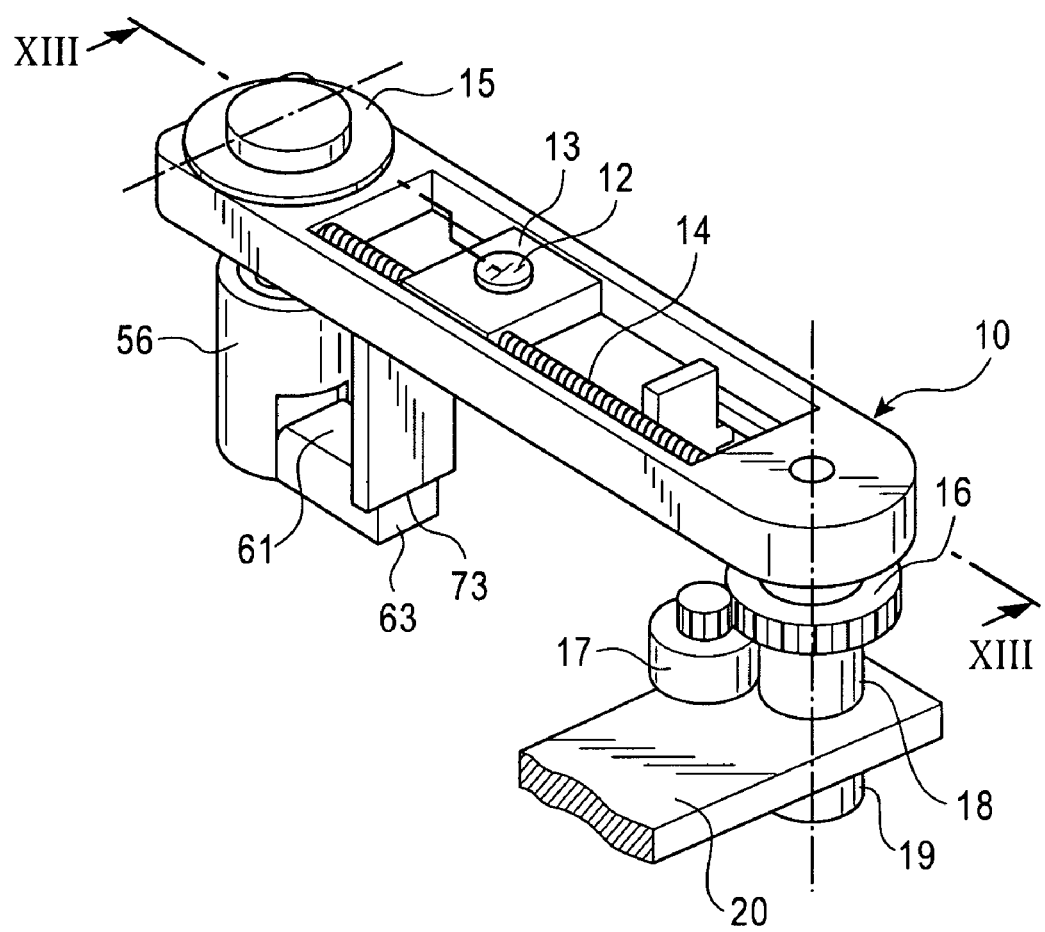
FIG. 12 is a perspective view of the rotation base when the rotation base rotates to the driving position and positioning is given.

As shown in FIGS. 9, 10, and 12, when the rotation base 10 moves to a driving position, that is, a position where the rotation base 10 can clamp a disk held by one of the disk supporters moved to the selected position, the center axis of the base supporter 9 coincides with the center axis of the disk.

The structure of the standby area W2 for the rotation base will be described next.

As shown in FIG. 2, in the standby area W2 for the rotation base in the case 1, a base plate 20 shown in FIG. 1 is disposed. The base plate 20 is supported by a plurality of supporters 19 and 20 fixed to the bottom panel 5 of the case 1. The supporters 19 and 20 may be made from a rigid material, such as synthetic resin. However, the supporters 19 and 20 are preferably made from a resilient material, such as an oil damper, in order to prevent vibration of the case 1 from being transmitted to the base plate 20.

A base shaft 18 is fixed to a rear portion of the rotation base 10. The base shaft 18 is freely rotatably supported by a bearing (not shown) mounted on the base plate 20. Accordingly, the rotation base 10 can freely rotate about the base shaft 18 in the horizontal direction. A driving mechanism is mounted on the base plate 20 to rotate the rotation base 10. The driving mechanism is composed of a motor 17 mounted on the base plate 20 and a gear train 16. The gear train 16 is composed of a pinion gear attached to an output shaft of the motor 17 and a driven gear coupled with the base shaft 18. The driven gear is engaged with the pinion gear.

As shown in FIG. 2, the rotation base 10 has a rectangular shape whose length is greater than its width. One end (rear end) of the rotation base 10 is rotatably supported by the base plate 20 so that the rotation base 10 can freely rotate about the base shaft 18. The other end (free end) of the rotation base 10 has a turntable 15 on which a disk is clamped and a spindle motor 105 (refer to FIG. 13) to rotate the turntable 15. In this embodiment, the turntable 15 includes a mechanism (not shown) to hold the periphery of the center hole of a disk. This mechanism is known as a self-clamp mechanism. However, a separated damper (not shown) may be provided at a position opposed to the turntable 15 and may clamp a disk on the turntable 15 by pinching the periphery of the center hole of the disk along with the turntable 15.

As shown in FIGS. 1 and 2, the rotation base 10 includes a head 13. The head 13 includes a field lens 12 facing the recording surface of a disk, a light emitting element (not shown) for emitting a laser beam, various optical devices (not shown) for leading the laser beam emitted from the light emitting element to the field lens 12, and a light-sensitive element (not shown) for receiving the laser beam, which is collected onto the recording surface of the disk by the field lens 12 and is reflected by the recording surface of the disk. A head of this type is known as an optical pick-up.

The rotation base 10 also has a thread mechanism including a guide section (not shown) for guiding the head 13 along the recording surface of the disk, a screw shaft 14 for providing a moving force to the head 13, and a thread motor (not shown) for rotating the screw shaft 14. The screw shaft 14 is rotated by the thread motor in the clockwise and counter-clockwise direction s so that the head 13 moves back and forth along the recording surface of the disk in the length direction of the rotation base 10.

Figure 11:
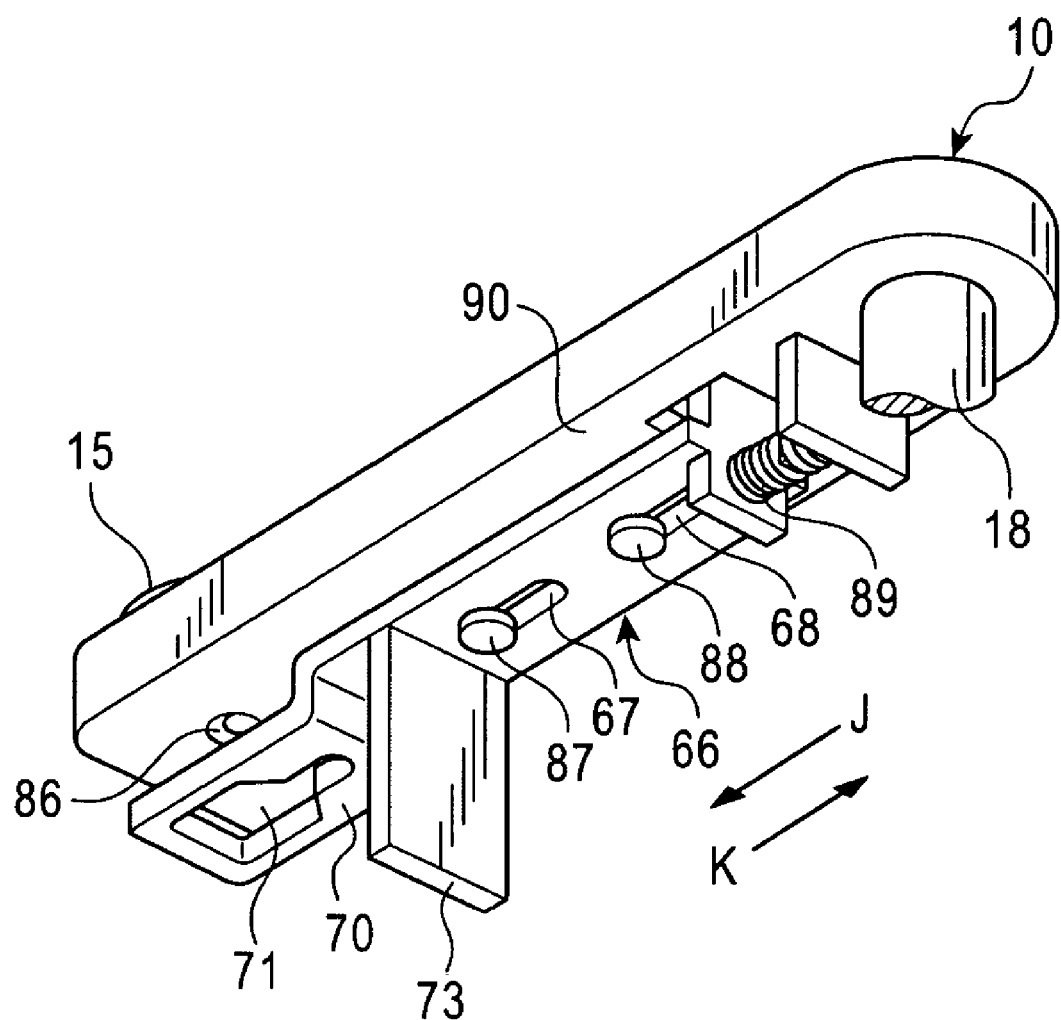
FIG. 11 illustrates the bottom of the rotation base mounting the lock member viewed in a direction of arrow A in FIG. 1.

As shown in FIG. 11, a lock member 66 is slidably attached to the back surface (lower surface) 90 of the rotation base 10. Two guide pins 87 and 88 are fixed to the back surface 90 with a predetermined spacing therebetween in the length direction of the rotation base 10. The lock member 66 has slits 67 and 68, to which the guide pins 87 and 88 are inserted respectively. The lock member 66 is guided by the guide pins 87 and 88 so as to slide on the rotation base 10 in the length direction of the rotation base 10 (in the J and K directions) without any play or looseness. As shown in FIG. 11, a compression coil spring 89 is disposed between the lock member 66 and the rear portion of the rotation base 10. The biasing force of the compression coil spring 89 always pushes the lock member 66 to the turntable 15 (in a direction towards the top end of the rotation base 10).

Figure 13:
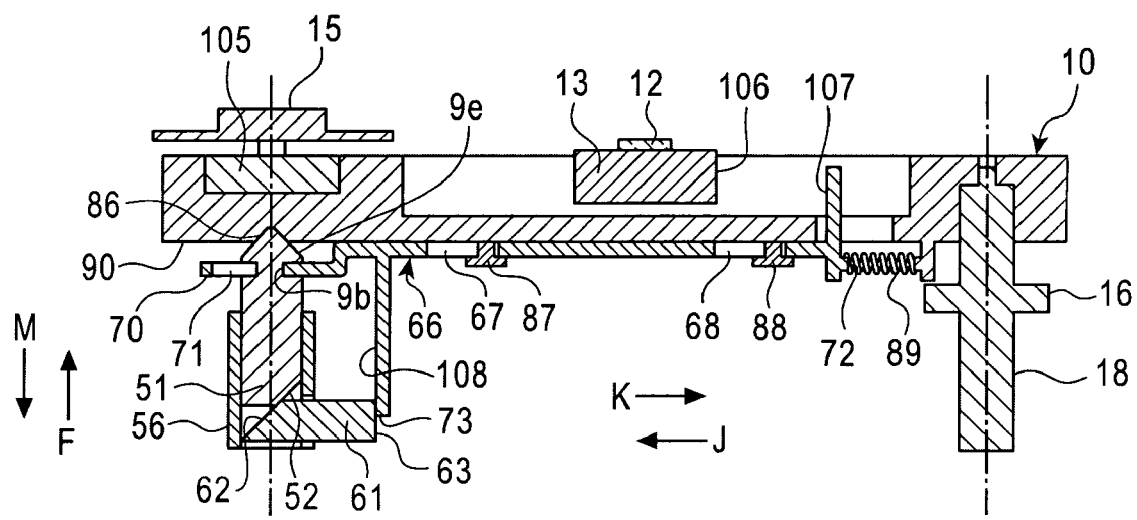
FIG. 13 is a sectional view of the rotation base along line XIII-XIII of FIG. 12.

As shown in FIG. 13, a pressing blade 107 extending towards the upper side of the rotation base 10 is coupled to an end of the lock member 66 in the K direction. This pressing blade 107 protrudes into an area where the head 13 moves. When the thread mechanism mounted in the rotation base 10 moves the head 13 towards an outer periphery of a disk (i.e., in the K direction), a press portion 106 mounted on the side of the head 13 pushes the pressing blade 107 in the K direction. Accordingly, the lock member 66 moves in the K direction against the biasing force of the compression coil spring 89. If, after the lock member 66 moves in the K direction, the head 13 moves in the J direction, the pushing force of the press portion 106 against the pressing blade 107 is released. Accordingly, the lock member 66 moves in the J direction due to the biasing force of the compression coil spring 89.

Figure 8:
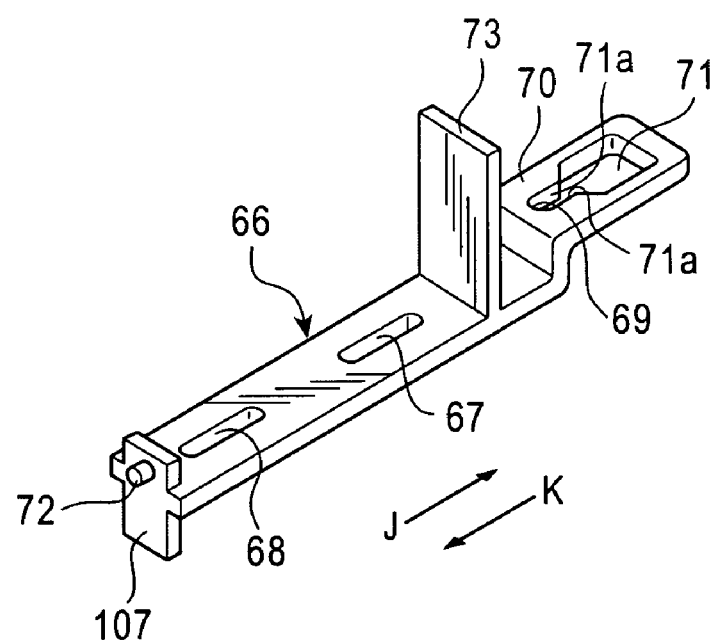
FIG. 8 is a perspective view of a lock member.

In FIG. 8, the lock member 66 is shown upside down. A link portion 70 is formed at a top end of the lock member 66 in a direction towards the turntable 15. The link portion 70 has a clearance slot 71 and a lock groove 69 connected to the clearance slot 71 and continuously extending towards the base shaft 18. The inner periphery of the clearance slot 71 includes sloped sides 71a. The distance between the sloped sides 71a gradually decreases as the sloped sides 71a extend towards the lock groove 69.

The width of the clearance slot 71 is greater than the maximum diameter of the tapered head 9e of the base supporter 9. The width of the lock groove 69 is slightly greater than the diameter of the small-diameter portion 9b of the base supporter 9. The small-diameter portion 9b can be put through the lock groove 69 with a minimum clearance. Additionally, the thickness of the link portion 70 is slightly smaller than the width of the small-diameter portion 9b of the base supporter 9 in its axis direction.

As shown in FIG. 11, a recess 86 is formed at an end of the back surface 90 of the rotation base 10. The shape of the recess 86 is a circular cone. As shown in FIG. 13, the convex tapered head 9e of the base supporter 9 can fit to the concave recess 86 so that the tapered head 9e and the recess 86 are positioned in the same center axis. Also, the center line of the recess 86 is positioned in the rotational axis of the turntable 15. Accordingly, when the tapered head 9e fits to the recess 86, the rotational axis of the turntable 15 coincides with the center axis of the base supporter 9.

Figure 7:
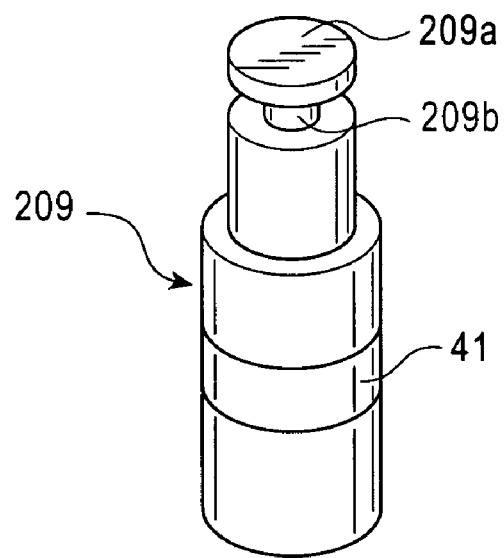
FIG. 7 is a perspective view of a base supporter according to another embodiment.

In this embodiment, the recess 86 is a hole having a circular cone shape. However, as shown in FIGS. 3 to 6, when the tapered head 9e of the base supporter 9 has a tapered surface, the recess 86 having a cylinder shape can fit to the tapered surface, and therefore, the rotational axis of the turntable 15 and the center axis of the base supporter 9 can be positioned on the same axis. Conversely, when the recess 86 has a circular cone shape, as in this embodiment, the shape of the head of the base supporter 9 may be a cylinder or a disk, as shown in FIG. 7. Alternatively, contrary to the structure in this embodiment, a protrusion having a circular cone shape may be formed at the end of the rotation base 10 on the back surface 90 and a recess having a shape to fit to the protrusion may be formed on the head of the base supporter 9.

The rotation base 10 is rotated by the motor 17 in the driving mechanism between a standby position shown in FIGS. 1 and 2 and a driving position shown in FIGS. 9 and 10. The stop positions of the rotation base 10 for the standby position and driving position are detected by a position sensor (not shown) mounted on the case I or the rotation base 10. The operation of the driving mechanism is controlled by the detection output of the position sensor.

The structure of the set area W3 of a disk loading unit will be described next.

As shown in FIGS. 2 and 10, the set area W3 of a disk loading unit includes a disk loading unit 30. The disk loading unit 30 is arranged between the disk insertion port 2 and the disk supporters 6, 7, and 8 shown in FIG. 1.

As shown in FIG. 10, the disk loading unit 30 includes two rollers 30a and 30b vertically opposed to each other and a motor (not shown) for rotating one of the two rollers. A disk located at the selected position and supported by the disk supporter is pinched by the two rollers and is ejected from the disk insertion port 2 by the rollers, one of which is rotated by the motor. In the same manner, a disk inserted into the disk insertion port 2 can be delivered to the disk supporter located at the selected position.

After a disk transfer operation is completed and a disk selection operation starts, when the disk supporters 6, 7, and 8 vertically move, the rollers 30a and 30b move away towards the disk insertion port 2 so that the elevating operation of the disks D1, D2, and D3 supported by the respective disk supporters 6, 7, and 8 is not prevented.

The disk loading unit 30 further includes a resilient member and a sensor (none are shown). The resilient member pushes the rollers 30a and 30b so that the two rollers get close to each other to generate a pinching force of the disk. The sensor detects an insertion and an ejection of the disk at the disk insertion port 2. Based on the detection output, the motor, which rotates the roller 30a or 30b, is controlled to start and stop.

The operation of the disk changer apparatus having such a structure according to the first embodiment will be described next. In the following description, among the three disks D1, D2, and D3 and the three disk supporters 6, 7, and 8, a user inserts the disk D2 into the case 1 through the disk insertion port 2, and the disk supporter 7 is located at the selected position to support the disk D2.

Disk Insertion Operation

When a user operates a disk insertion button (not shown), the motor in the disk selection mechanism rotates the variable-pitch lead screw 26 to move the empty disk supporter 7, which is one of the three disk supporters 6, 7, and 8, to the selected position at the same height as the disk insertion port 2. The disk supporter 7 then waits for the disk insertion. If the disk supporter 7 is located at the selected position in advance, the disk selection mechanism does not operate even when the disk insertion button is operated and the disk supporter 7 immediately waits for the disk insertion. During the disk insertion waiting time, as shown in FIG. 2, the rollers 30a and 30b of the disk loading unit 30 is positioned so as to transfer a disk inserted into the disk insertion port 2 to the disk supporter 7. That is, the rollers 30a and 30b are positioned so that the rollers 30a and 30b vertically overlap the disks D1 and D3 supported by the disk supporters 6 and 8 located at upper and lower positions of the disk supporter 7. The rollers 30a and 30b are in close contact with each other by a biasing force caused by the resilient member.

During such a disk insertion waiting time, when a user slightly inserts the disk D2 into the disk insertion port 2 and the sensor mounted on the disk loading unit 30 detects the insertion, the rollers 30a and 30b start rotating. When the disk D2 is further inserted into the disk insertion port 2, the rollers 30a and 30b pinch the disk D2 to deliver it into the case 1. The disk D2 is held by the disk supporter 7.

When a sensor (not shown) detects that the disk D2 is held by the disk supporter 7, the rollers 30a and 30b move away from the disk D2 towards a position near the disk insertion port 2 where the rollers 30a and 30b do not overlap the disks D1, D2, and D3 supported by the disk supporters 6, 7, and 8.

Lock Operation of Rotation Base

When playback or recording operation on the disk D2 is instructed, the rotation base 10, immediately after the rollers 30a and 30b move away, rotates from the standby position shown in FIGS. 1 and 2 to the driving position shown in FIGS. 9 and 10 by the driving force caused by the driving mechanism. At that time, screw threads of the variable-pitch lead screw 26 cause the disk supporter 7 at the selected position and the disk supporter 8 located beneath the disk supporter 7 to be vertically spaced. The rotation base 10 moves in the space formed between the disks D2 and D3 supported by the disk supporters 7 and 8. As shown in FIG. 9, when the position sensor (not shown) detects that the center axis of the base supporter 9 coincides with the rotational axis of the turntable 15, the operation of the driving mechanism stops, and therefore, the rotation of the rotation base 10 stops.

While the rotation base 10 stays at the standby position and while the rotation base 10 rotates between the standby position and the driving position, the head 13 is moved away to a maximum movable position in the K direction, namely, a position closest to the base shaft 18. Consequently, the pressing blade 107 of the lock member 66 is pushed in the K direction by the press portion 106 of the head 13. The lock member 66 keeps the position moved in the K direction on the back surface 90 of the rotation base 10. Alternatively, the lock member 66 may be moved by operating the thread mechanism to move the head 13 in the K direction immediately after the rotation base 10 moves to the driving position and stops its rotational movement. That is, it is only required that the lock member 66 is moved in the K direction when the rotation base 10 moves to the driving position and stops its rotational movement.

Figure 14:
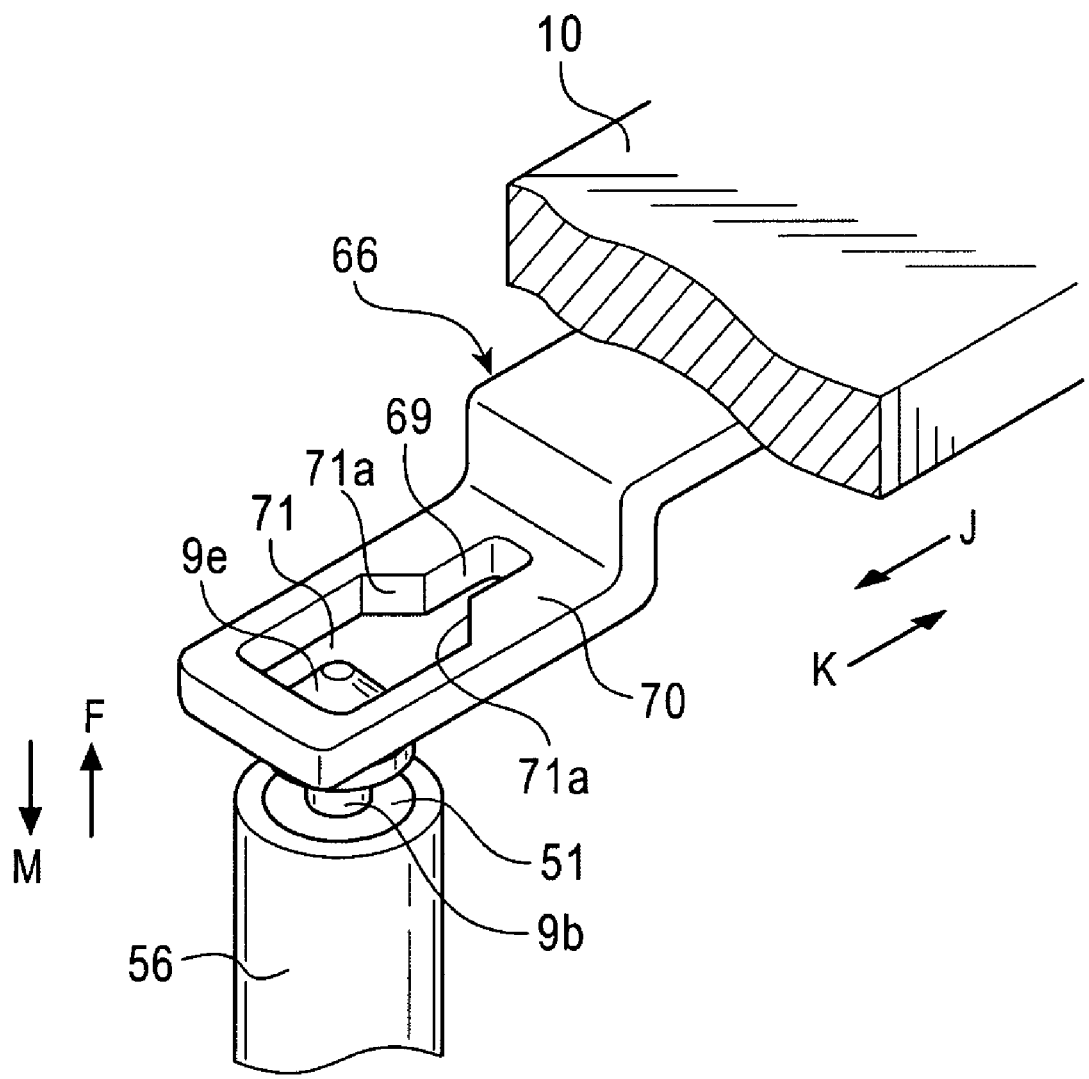
FIG. 14 is a perspective view partly in section illustrating a positional relationship between the base supporter and the lock member before the base supporter protrudes.

As described above, when the rotation base 10 stops at the driving position, the lock member 66 is moved to the maximum movement position in the K direction. Therefore, as shown in FIG. 14, the tapered head 9e of the base supporter 9 is opposed to the clearance slot 71 formed in the link portion 70 of the lock member 66 from underneath.

After the rotation base 10 rotates and stops at the driving position, the thread mechanism starts so as to move the head 13 located at the base shaft 18 side towards the turntable 15 side (in the J direction).

When the head 13 moves in the J direction, the head 13 moves the lock member 66 by a predetermined distance in the J direction while the pressing blade 107 is in contact with the press portion 106 due to the biasing force of the compression coil spring 89. Additionally, as shown in FIG. 13, when the lock member 66 moves in the J direction, a press surface 108 of a lip 73 extending from the back surface of the lock member 66 is brought into contact with a side surface 63 of the push lever 61. Accordingly, the push lever 61 is pushed in the J direction. At that time, since the slope portion 62 of the push lever 61 pushes the slope portion 52 formed at a lower end of the lock shaft 51 of the base supporter 9, the base supporter 9 protrudes in the F direction (in the upward direction) due to a component force of the pushing force.

Figure 15:
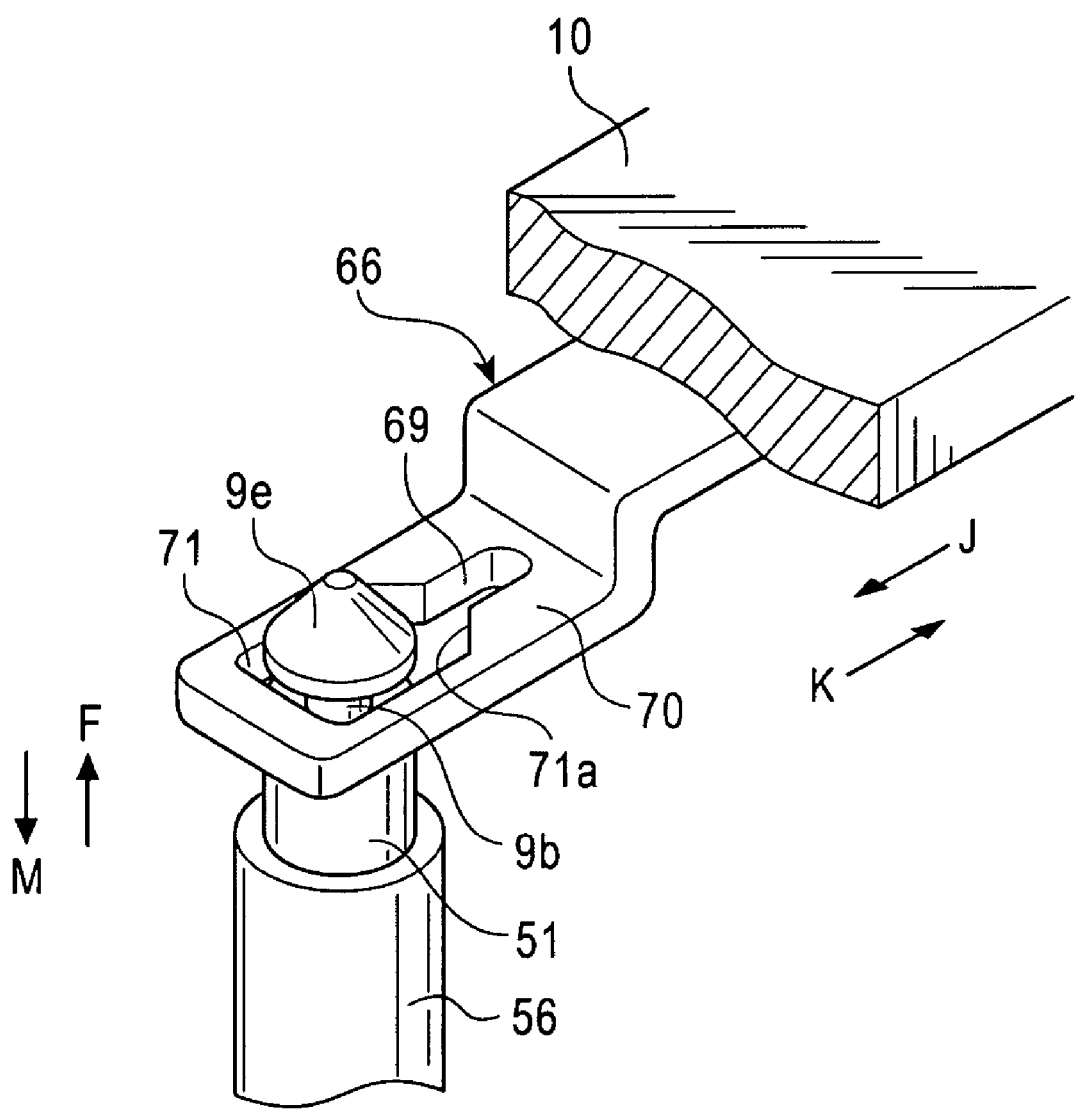
FIG. 15 is a perspective view partly in section illustrating a positional relationship between the base supporter and the lock member after the base supporter protrudes.

At that moment, as shown in FIG. 15, the length of the clearance slot 71 (in the J and K directions) is designed such that, immediately after the base supporter 9 protrudes in the F direction and the small-diameter portion 9b of the base supporter 9 enters the clearance slot 71 of the lock member 66, the sloped sides 71a of the clearance slot 71 get into the small-diameter portion 9b.

Figure 16:
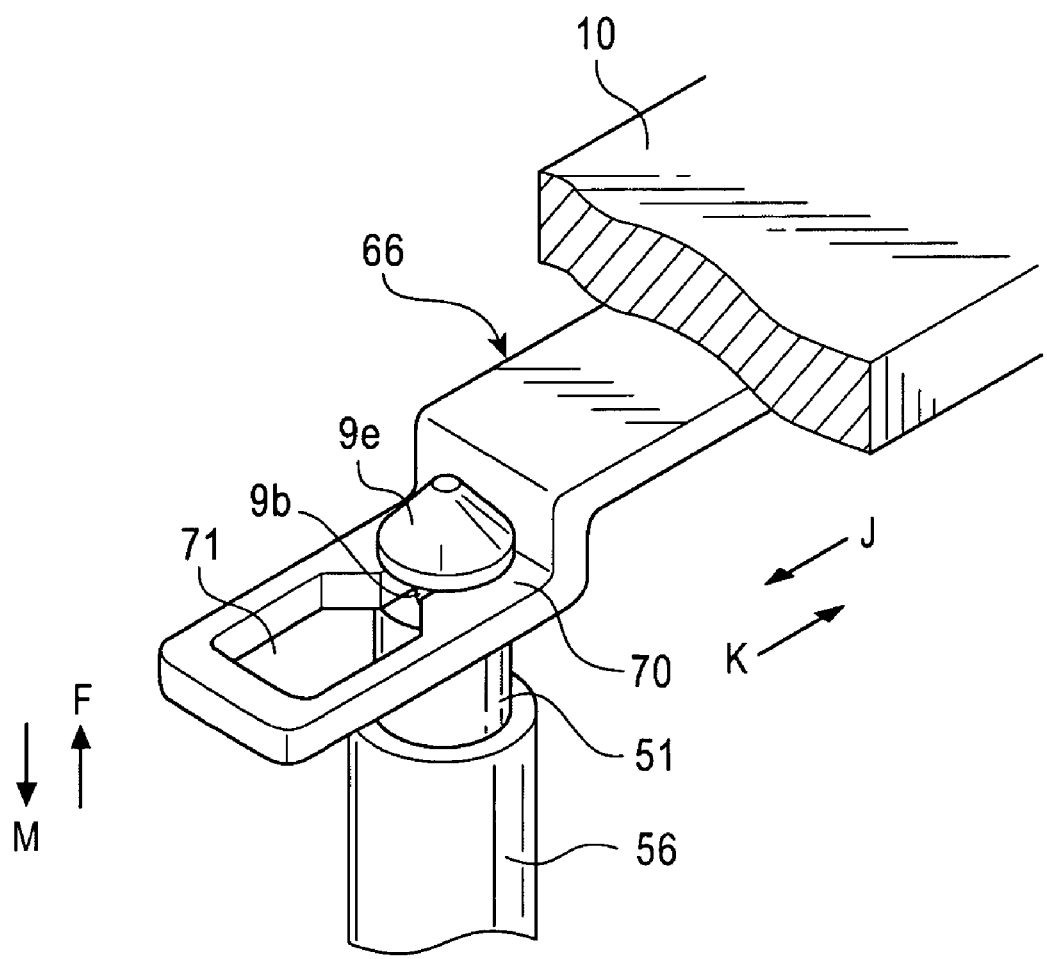
FIG. 16 is a perspective view partly in section illustrating the base supporter and the lock member connected to each other.

When the head 13 and the lock member 66 further move in the J direction, the small-diameter portion 9b of the base supporter 9 gets into the inside of the lock groove 69 of the lock member 66, as shown in FIG. 16. Thus, the base supporter 9 is connected to the lock member 66 so as not to move in the rotational direction of the rotation base 10 and in the axis direction of the base supporter 9 (vertical direction).

As shown in FIG. 13, while maintaining this state, the tapered head 9e of the base supporter 9 fits to the recess 86 formed on the back surface 90 of the rotation base 10. Thus, the rotational operation is reliably controlled with the rotational center axis of the turntable 15 aligned with the axis of the base supporter 9. Even though the rotation base 10 accidentally receives external vibrations, the rotation base 10 does not move. As a result, the rotation base 10 can be precisely positioned.

Disk Clamp Operation and Recording/Playback Operation

As described above, the rotation base 10 moves to the driving position and the rotational center axis of the turntable 15 is positioned on the center axis of the base supporter 9. At that time, the rotation base 10 is located in a space formed by the disk D2 supported by the disk supporter 7 at the selected position and the disk D3 supported by the disk supporter D8 beneath the disk D2. Also, the turntable 15 is located beneath the disk D2. The lock shaft 51 of the base supporter 9 and the shaft holder 56 pass through a center hole of the disk D3 supported by the disk supporter D8 located beneath the selected disk supporter 7.

Subsequently, the variable-pitch lead screw 26 of the disk selection mechanism rotates to slightly lower the disk supporters 6, 7, and 8. This also lowers the disk D2 located immediately above the turntable 15, and therefore, the disk D2 is mounted on the turntable 15. Thereafter, the self-clamp mechanism installed in the turntable 15 clamps the periphery of the center hole of the disk D2 on the turntable 15.

In this embodiment, to mount the disk D2 supported by the selected disk supporter 7 on the turntable 15, the disk selection mechanism lowers the disk supporter 7. However, instead of changing the height of the disk supporters 6, 7, and 8, the base plate 20, which supports the rotation base 10, may be slightly lifted to mount the disk D2 on the turntable 15.

Upon completion of the clamp operation of the disk D2, the spindle motor 105 drives the turntable 15 to rotate the disk D2. Since the disk selection mechanism maintains the disk supporter 7 for supporting the disk D2 at a height level where the disk supporter 7 is not in contact with the surface of the disk D2 clamped by the turntable 15, the rotating disk D2 is not brought into sliding contact with the disk supporter 7.

The thread mechanism then moves the head 13 in a radial direction of the disk D2 to carry out an information recording operation on the disk D2 or an information playback operation from the disk D2. During the recording or playback operation, to prevent the press portion 106 of the head 13 from being brought into contact with the pressing blade 107 of the lock member 66 and to prevent the connection between the lock member 66 and the base supporter 9 from being released, the pressing blade 107 of the lock member 66 is placed at a position where the pressing blade 107 is not brought into contact with the press portion 106 even when the head 13 moves to the outermost periphery of the disk D2, that is, even when the head 13 accesses the outermost track of the disk D2.

Disk Selection Operation

During or after the playback and recording operations on the disk D2, when a user operates to select another disk, the process enters a disk selection operation mode. A disk selection operation when the uppermost disk D1 is selected will be described next.

When the uppermost disk D1 is selected, the reverse operation to the above-described operation is carried out. That is, the spindle motor 105 stops its rotation. The rotation of the disk D2 is stopped and the clamp mode is released. The variable-pitch lead screw 26 then rotates to slightly lift the disk supporters 6, 7, and 8, and therefore, the disk D2 is supported by the disk supporter 7.

Thereafter, the thread mechanism moves the head 13 towards the base shaft 18 (in the K direction). The press portion 106 of the head 13 moving in the K direction pushes against the pressing blade 107 shown in FIG. 13, and therefore, the lock member 66 is moved in the K direction. At that time, the lock groove 69 formed in the link portion 70 of the lock member 66 gets unhooked from the small-diameter portion 9b of the base supporter 9, and the lip 73 mounted on the lock member 66 moves away from the push lever 61. Accordingly, the biasing force of the spring S moves back the base supporter 9 in the M direction (in a downward direction). As a result, as shown in FIG. 14, the connection between the lock member 66 and the base supporter 9 is released.

The rotation base 10 is then rotated about the base shaft 18 by the motor 17 in the driving mechanism to move the standby position, where the rotation base 10 does not overlap the disks D1, D2, and D3 supported by the disk supporters 6, 7, and 8, as shown in FIGS. 1 and 2.

Subsequently, the disk selection mechanism starts again to rotate the variable-pitch lead screw 26. The uppermost disk supporter 6 moves to the wider pitch portion of the variable-pitch lead screw 26 and stops at the selected position. Also, a rotational force of the variable-pitch lead screw 26 moves the disk supporters 7 and 8 located beneath the selected disk supporter 6 to the narrower pitch portion of the variable-pitch lead screw 26, which is a lower portion of the variable-pitch lead screw 26. Accordingly, a space is formed between the disk D1 supported by the newly selected disk supporter 6 and the disk D2 supported by the lowered disk supporter 7.

At that time, the base supporter 9 and the shaft holder 56 pass through the center holes of the disks D2 and D3 supported by the disk supporters 7 and 8, except for the disk supporter 6 located at the selected position. That is, during the disk selection operation, the center holes of the disks D2 and D3 supported by the disk supporters 7 and 8 located beneath the selected disk supporter 6 vertically move while the base supporter 9 passes through the center holes. As described above, by utilizing spaces inside the center holes of the disks D1, D2, and D3 as the installed area of the base supporter 9, a dedicated space for installing the base supporter 9 is not required. As a result, a space inside the case 1 can be efficiently utilized.

Additionally, as described above, the base supporter 9 passes through the center holes of the disks D2 and D3 located beneath the disk D1. Consequently, even when vibrations and shocks are applied to the case 1, it is prevented that the disks D2 and D3 fall off from the disk supporters 7 and 8.

Thereafter, the above-described lock operation of the rotation base 10, clamp operation of the disk, and recording/playback operation on the disk are carried out. The rotation base 10 rotates toward the driving position. The newly selected disk D1 supported by the disk supporter 6 is clamped on the turntable 15 and is driven to rotate.

Disk Eject Operation

When a user operates a disk eject button (not shown) to provide an instruction to eject the disk D1 currently being driven, the rotation of the spindle motor 105 stops and clamping of the disk D1 is released. The disk selection mechanism then slightly lifts the disk supporters 6, 7, and 8, and therefore, the disk D1 is supported by the disk supporter 6. At that time, the disk supporter 6 moves to the selected position at substantially the same height level as the disk insertion port 2.

Thereafter, in the same manner as described above, the head 13 moves in the K direction to release the connection between the lock member 66 and the base supporter 9. The driving mechanism then moves the rotation base 10 to a position where the rotation base 10 does not overlap the disks D1, D2, and D3 supported by the disk supporters 6, 7, and 8.

Subsequently, as shown in FIG. 2, the rollers 30a and 30b of the disk loading unit 30 move to a position where the rollers pinch the outer periphery of the disk D1 supported by the selected disk supporter 6. The disk D1 is ejected from the disk insertion port 2 by the rollers 30a and 30b rotating in the disk eject direction while pinching the disk D1.

As described above, according to the embodiment, a disk changer apparatus includes a lock control mechanism in which the lock member 66 is connected to the base supporter 9 and the connection is released by using the press portion 106 of the head 13, the pressing blade 107 and the lip 73 attached to the lock member 66 as an integral part, the push lever 61, and the compression coil spring 89. In this embodiment, the compression coil spring 89 is used to move the lock member 66 in the J direction to connect to the base supporter 9, and the thread motor in the thread mechanism is also used to move the lock member 66 in the K direction to release the connection between the lock member 66 and the base supporter 9. However, the disk changer apparatus may include an independent lock control mechanism in which dedicated driving force is used to move the lock member 66 in the J and K directions.

Although the present invention have been described herein with reference to the first embodiment, it is to be understood that the invention is not limited to this precise embodiment, and that various other changes and modifications may be made therein.

FIG. 7 illustrates a base supporter 209 used in a disk changer apparatus according to a second embodiment of the present invention. The base supporter 209 is provided in place of the base supporter 9 according to the above-described first embodiment of the present invention. Unlike the base supporter 9, the base supporter 209 does not protrude in its axial direction (in the upward direction).

As shown in FIG. 7, the base supporter 209 is mounted on the bottom panel 5 of the case 1 and does not move in its axial direction. The base supporter 209 is disposed at a position opposed to the rotational center axis of the turntable 15 mounted on the rotation base 10 when the base supporter 9 rotates towards the driving position. When one of the disk supporters 6, 7, and 8 moves downward during disk selection operation, the base supporter 209 passes through the center hole of a disk supported by the disk supporter.

As shown in FIG. 7, a head 209a of the base supporter 209 is formed as a cylinder not having a tapered face. The base supporter 209 is fixed to the bottom panel 5 of the case 1 with a resilient member 41 therebetween. The whole body of the resilient member 41 may be made from a resilient material, such as rubber. Alternatively, the resilient member 41 may be a fluid damper. Gas or liquid is sealed in a hollow elastic body to form the fluid damper.

Figure 17:
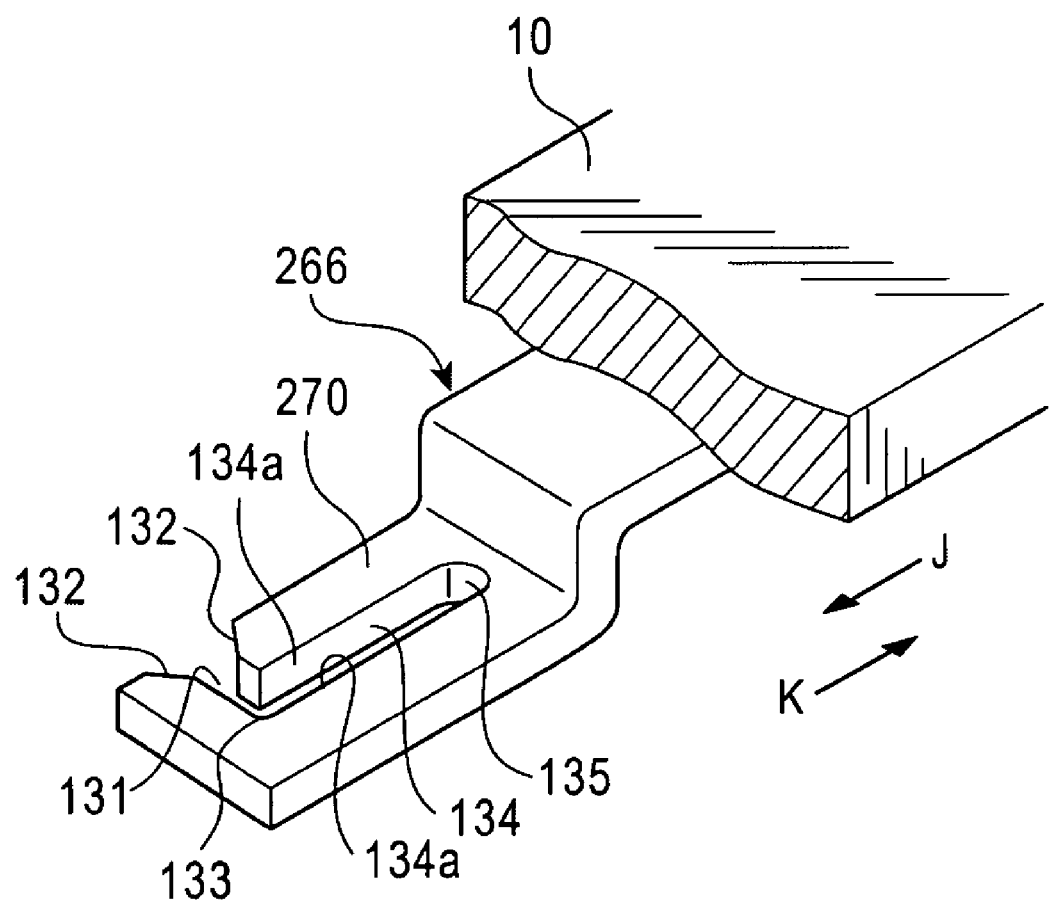
FIG. 17 is a perspective view partly in section illustrating the shape of a lock member in a disk changer apparatus according to a second embodiment of the present invention.
Figure 18:
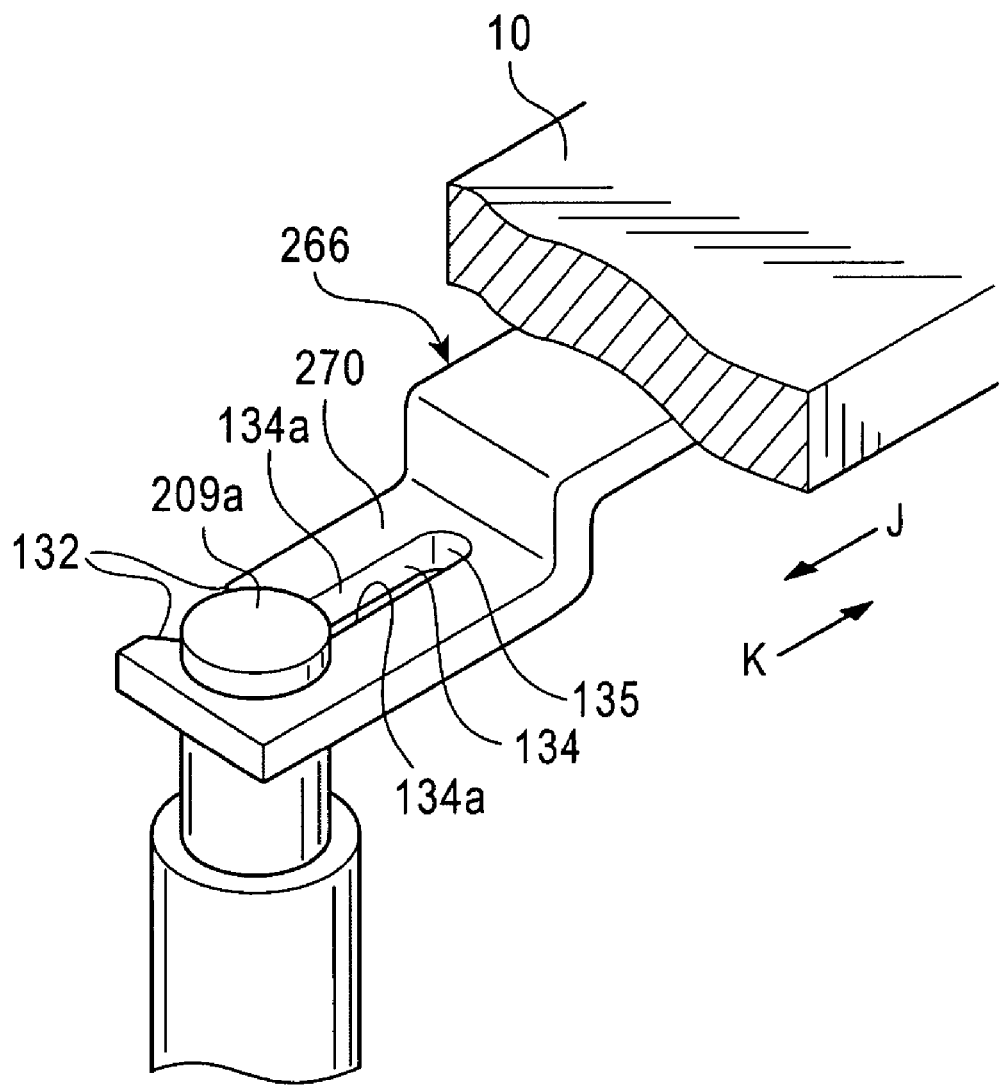
FIG. 18 is a perspective view partly in section illustrating a base supporter and the lock member connected to each other according to the second embodiment.
Figure 19:
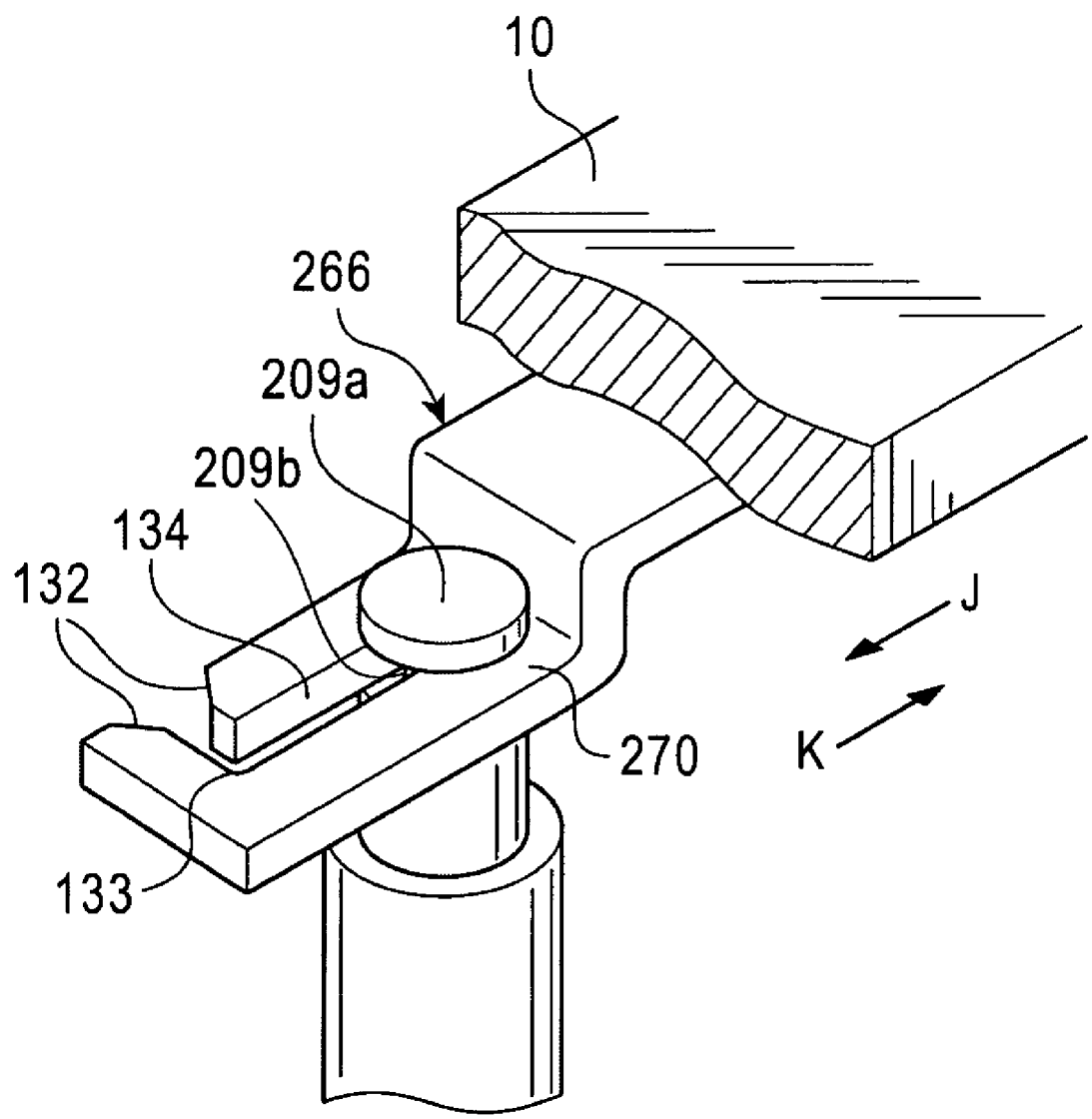
FIG. 19 is another perspective view partly in section illustrating the base supporter and the lock member connected to each other according to the second embodiment.

According to the second embodiment, the disk changer apparatus includes the base supporter 209 shown in FIG. 7. The disk changer apparatus further includes a lock member 266 on the back surface of the rotation base 10, as shown in FIGS. 17 to 19, in place of the above-described lock member 66. The lock member 266 is slidably movable in the J and K directions.

A guide groove 131 is formed at an end of a connection part 270, which is an end of the lock member 266 in the J direction. The guide groove 131 has an opening on a side of the connection part 270. In the opening of the guide groove 131, a guide section 132 composed of chamfered edges and a corner section 133 are formed. Additionally, a holding groove 134 continuously extending from the guide groove 131 in the K direction is formed in the connection part 270. Like the lock member 66 in the first embodiment, the lock member 266 has the pressing blade 107 protruding into the moving area of the head 13, and a biasing force caused by the compression coil spring 89 is always applied to the pressing blade 107 in the J direction.

According to the second embodiment, the disk changer apparatus includes the above-described base supporter 209 and lock member 266. When the rotation base 10 rotates from the standby position shown in FIGS. 1 and 2 to the driving position shown in FIGS. 9 and 10, a small-diameter portion 209b of the base supporter 209 gets into the guide groove 131 of the lock member 266 and the corner section 133 of the guide groove 131 is brought into contact with the small-diameter portion 209b, as shown in FIG. 18. Consequently, the rotation base 10 is positioned at the driving position.

Thereafter, when the thread mechanism moves the head 13 in the J direction, the lock member 266 moves in the J direction while following the head 13 due to the biasing force caused by the compression coil spring 89. Accordingly, as shown in FIG. 19, the small-diameter portion 209b of the base supporter 209 fits into the holding groove 134, and therefore, the lock member 266 is connected to the base supporter 209.

In the disk changer apparatus according to the second embodiment, the rotation base 10 rotates to the driving position and is connected to the base supporter 209. With the lock member 266 connected to the base supporter 209, the top end of the rotation base 10 is supported by the base supporter 209 located on the same axis as the rotational center axis of the turntable 15. In addition, since the base supporter 209 is resiliently supported by the resilient member 41 shown in FIG. 7, the top end of the rotation base 10 is also resiliently supported by the bottom panel 5 of the case 1 via the base supporter 209 and the resilient member 41. Accordingly, even when the case 1 receives external vibrations, the turntable 15 and the surface of a disk rotated by the turntable 15 are prevented from shaking. In addition, the resilient member 41 may be provided to the lock shaft 51 of the base supporter 9, shown in FIGS. 3 to 5, according to the first embodiment.

Figure 20:
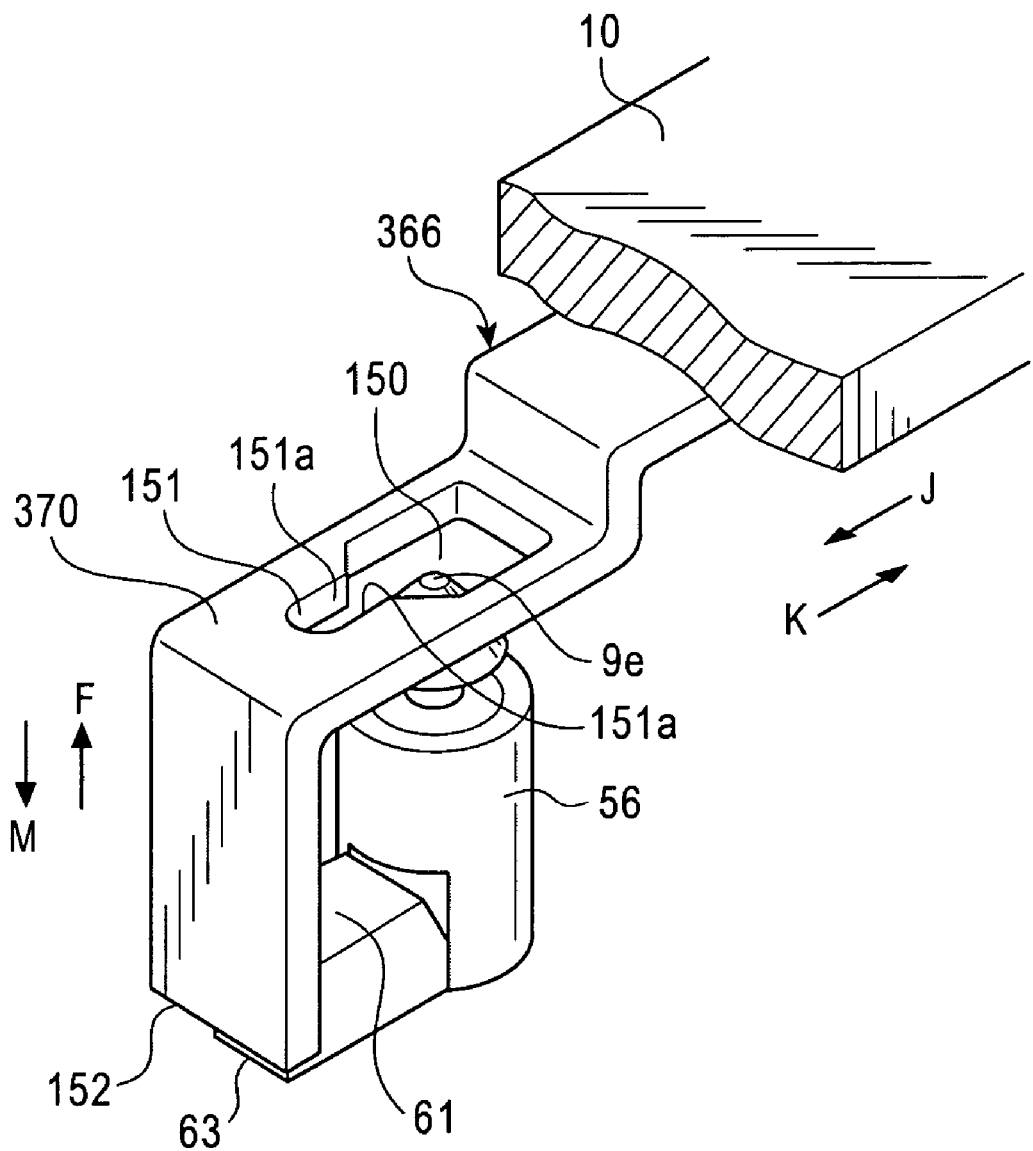
FIG. 20 is a perspective view partly in section illustrating a positional relationship between a base supporter and a lock member in a disk changer apparatus according to a third embodiment of the present invention before the base supporter protrudes.
Figure 21:
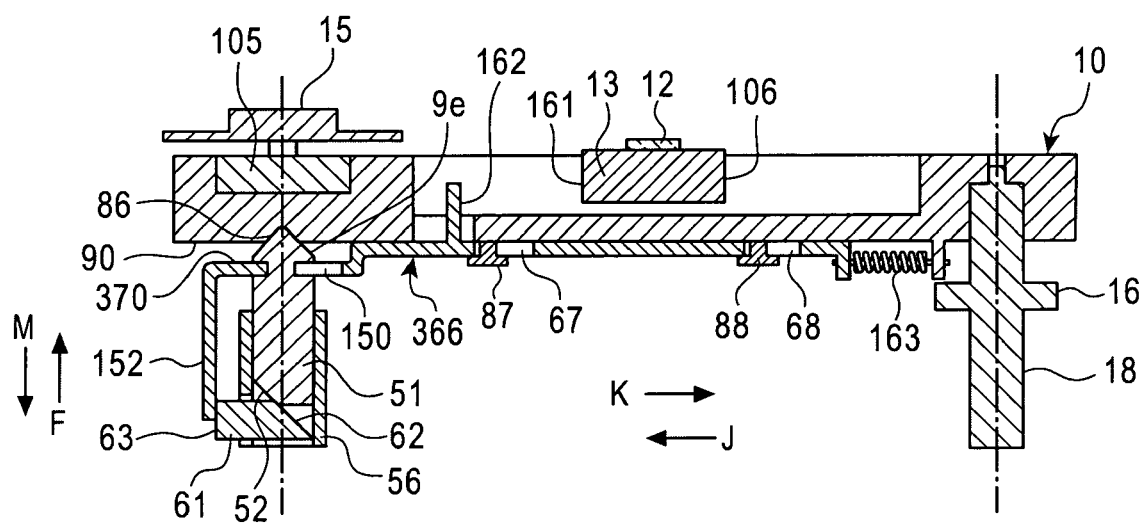
FIG. 21 is a sectional view of a rotation base according to the third embodiment when the rotation base is locked.
Figure 22:
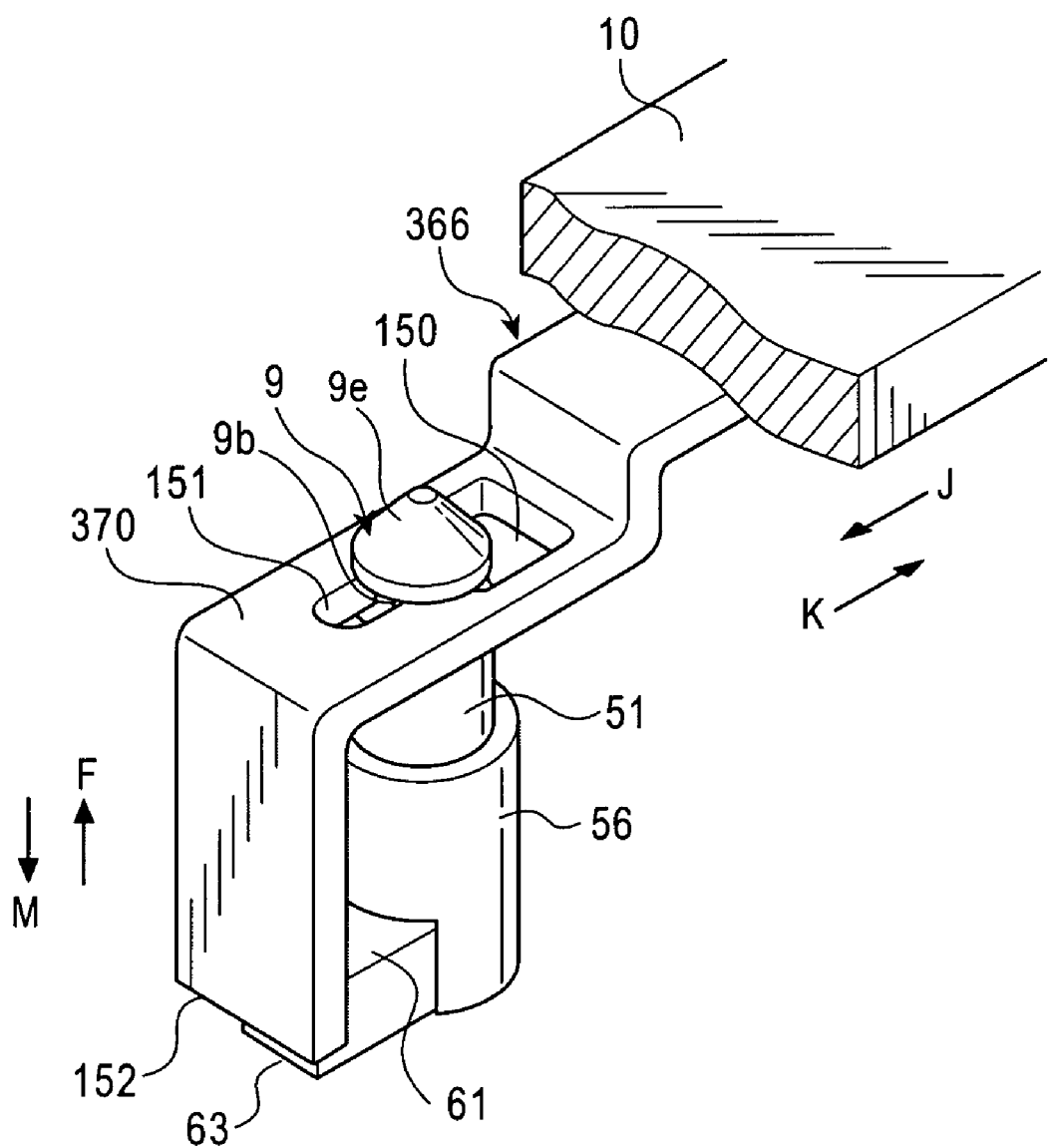
FIG. 22 is a perspective view partly in section illustrating a positional relationship between the base supporter and the lock member according to the third embodiment after the base supporter protrudes.
Figure 23:
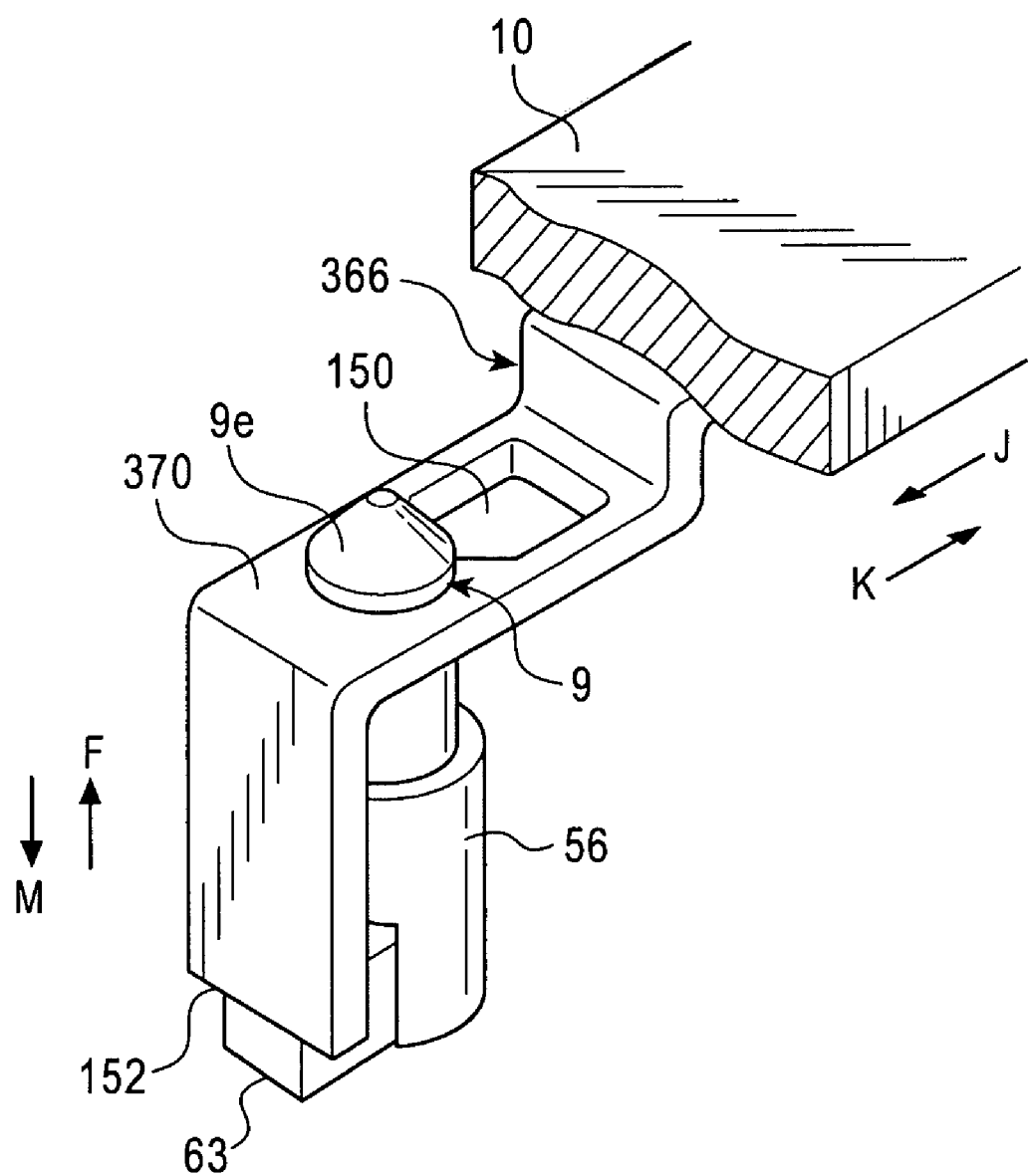
FIG. 23 is a perspective view partly in section illustrating the base supporter and the lock member connected to each other according to the third embodiment.

FIG. 20 is a perspective view partly in section illustrating a relationship between positions of a base supporter and a lock member of a disk changer apparatus according to a third embodiment of the present invention. FIG. 21 is a sectional view of a rotation base in a lock mode according to the third embodiment. FIGS. 22 and 23 are sectional perspective views of a connection between the base supporter and the lock member according to the third embodiment.

In the third embodiment, as shown in FIG. 20, a link portion 370 of a lock member 366 has a clearance slot 150 and a lock groove 151 connected to the clearance slot 150 and continuously extending in the J direction. A base supporter 9 according to the third embodiment is identical to the base supporter 9 according to the first embodiment.

As shown in FIG. 21, a pressing blade 162 is formed on the lock member 366 at an inner periphery side of a disk, namely, at a turntable 15 side. When the rotation base 10 is located at the standby position, the head 13 is moved to the inner periphery side of a disk. A press portion 161 on the side of the head 13 pushes against the pressing blade 162 so that the lock member 366 is moved in the J direction.

When the rotation base 10 moves to the driving position, the head 13 moves to the outer periphery side of a disk (in the K direction). Accordingly, the lock member 366 moves in the K direction due to a biasing force of a tension coil spring 163 shown in FIG. 21. At that time, a lip 152 formed on the lock member 366 pushes against the push lever 61 in the K direction. By the movement force of the push lever 61, the base supporter 9 protrudes in the F direction. As shown in FIG. 23, the small-diameter portion 9b of the base supporter 9 gets into the lock groove 151 of the lock member 366. Consequently, the lock member 366 is connected to the base supporter 9.

In the third embodiment, when the rotation base 10 rotates from the standby position to the driving position, the head 13 is located at the inner periphery side of a disk. Accordingly, the head 13 can read TOC (table of content) information recorded in the innermost periphery of the disk immediately after the disk is played back. Additionally, to prevent accidental release of the connection between the lock member 366 and the base supporter 9 due to a press portion 161 of the head 13 brought into contact with the pressing blade 162 of the lock member 366 during playback and recording time, the pressing blade 162 of the lock member 366 is held at a position where the pressing blade 162 is not brought into contact with the press portion 161 even when the head 13 moves to the innermost periphery of the disk D2, that is, even when the head 13 accesses the innermost track of the disk D2.

In the above-described embodiments, the base supporters 9 and 209, the shaft holder 56, and the push lever 61 are directly mounted on the bottom panel 5 of the case 1. However, these components may be mounted on the base plate 20 and the supporters 19 and 20, which support the base plate 20, may be made from a resilient material. This structure sufficiently prevents vibration without the resilient member 41. In addition, a mechanism for moving the base supporter 9 in the F and M directions is not limited to the above-described push lever 61. For example, a screw shaft is attached to the base supporter 9 by screws. The screw shaft is engaged with the gear train 16, which rotates the rotation base 10 to the driving position, via another gear. The screw shaft rotates in the clockwise and counterclockwise direction s in synchronization with the rotation of the rotation base 10 so that the base supporter 9 can be moved in the F and M directions.

Furthermore, in the above-described embodiments, the driving position of a disk is determined so that the selected disk clamped on the turntable is coaxially aligned with other standby disks supported by the disk supporters. However, the driving position of the rotation base (i.e., the rotational center position of the turntable) may be determined so that the selected disk is driven to rotate at a position slightly pulled out from the disk supporter.

What is claimed is:

1. A disk changer apparatus comprising:
 a plurality of disk supporters, each of the disk supporters operable to support a disk, the disk supporters being stacked vertically;
 a disk selection mechanism operable to move the plurality of disk supporters vertically and to place one of the disk supporters at a selected position;
 a rotation base comprising a turntable and a head, the rotation base being rotatable about the rear end portion thereof;
 a driving mechanism operable to rotate the rotation base between a driving position and a standby position, the driving position being a position where one of a center of a disk supported by the disk supporter located at the selected position or a center of a disk pulled out from the disk supporter located at the selected position is aligned with a center of the turntable, the standby position being a position where the rotation base does not overlap the disk supported by the disk supporter;
 a lock member movably mounted on the rotation base;
 a base supporter opposite a top end of the rotation base when the rotation base moves to the driving position; and
 a lock control mechanism operable to interconnect the lock member and the base supporter when the rotation base moves to the driving position.

2. The disk changer apparatus according to claim 1, wherein the base supporter is located at a position where the base supporter is capable of passing through the center hole of a disk supported by a disk supporter other than the disk supporter located at the selected position.

3. The disk changer apparatus according to claim 1, wherein the base supporter is resiliently supported by a resilient member in a case when the lock member is connected to the base supporter and one disk is driven to rotate by the turntable.

4. The disk changer apparatus according to claim 1, wherein the rotation base comprises a thread mechanism operable to reciprocally move the head along a surface of the disk and the lock control mechanism is operable to interconnect the lock member and the base supporter or release the base supporter from the lock member in accordance with the movement of the head.

5. The disk changer apparatus according to claim 4, wherein the lock member is biased by a spring in a direction tending to interconnect the lock member and the base supporter and, when the head moves in one of the reciprocal directions, the lock member is moved by the head in a direction against the biasing force of the spring tending to release the base supporter from the lock member.

6. The disk changer apparatus according to claim 5, wherein the lock member is mounted on the rotation base such that the lock member is slidably movable in the same moving direction as the head, the lock member comprises a pressing blade extending into a moving area of the head, and the head presses against the pressing blade so as to move the lock member in a direction tending to release the base supporter.

7. The disk changer apparatus according to claim 1, wherein a center axis of the base supporter is substantially coaxially aligned with a rotational center axis of the turntable when the lock member is connected to the base supporter.

8. The disk changer apparatus according to claim 1, wherein a recess portion is formed on one of the top end of the rotation base and the base supporter, a protrusion operable to fit into the recess portion is formed on the other of the top end of the rotation base and the base supporter, and, when the rotation base rotates to the driving position, the base supporter moves toward the rotation base so that the protrusion fits into the recess portion.

9. The disk changer apparatus according to claim 8, wherein the lock member is operable to vertically move the base supporter toward the rotation base.

10. A disk changer apparatus comprising:
a plurality of disk supporters, each of the disk supporters operable to support a disk, the disk supporters being stacked vertically;
a disk selection mechanism operable to move the plurality of disk supporters-vertically and place one of the disk supporters at a selected position;
a rotation base comprising a turntable and a head, the rotation base being rotatable about the rear end portion thereof;
a driving mechanism operable to rotate the rotation base between a driving position and a standby position, the driving position being a position where one of a center of a disk supported by the disk supporter located at the selected position or a center of a disk pulled out from the disk supporter located at the selected position is aligned with a center of the turntable, the standby position being a position where the rotation base does not overlap the disk supported by the disk supporter;
a lock member movably mounted on the rotation base;
a base supporter opposite a top end of the rotation base when the rotation base moves to the driving position; and
a lock control mechanism operable to interconnect the lock member and the base supporter when the rotation base moves to the driving position;
wherein the base supporter is located at a position where the base supporter is capable of passing through the center hole of a disk supported by a disk supporter other than the disk supporter located at the selected position.

11. The disk changer apparatus according to claim 10, wherein the base supporter is resiliently supported by a resilient member in a case when the lock member is connected to the base supporter and the disk is rotated by the turntable.

12. The disk changer apparatus according to claim 10, wherein the rotation base comprises a thread mechanism operable to reciprocally move the head along a surface of the disk and the lock control mechanism is operable to interconnect the lock member and the base supporter or release the base supporter from the lock member in accordance with the movement of the head.

13. The disk changer apparatus according to claim 12, wherein the lock member is biased by a spring in a direction tending to interconnect the lock member and the base supporter and, when the head moves in one of the reciprocal directions, the lock member is moved by the head in a direction against the biasing force of the spring tending to release the base supporter from the lock member.

14. The disk changer apparatus according to claim 13, wherein the lock member is mounted on the rotation base such that the lock member is slidably movable in the same moving direction as the head, the lock member comprises a pressing blade extending into a moving area of the head, and the head presses against the pressing blade so as to move the lock member in a direction to release the base supporter from the lock member.

15. The disk changer apparatus according to claim 10, wherein a center axis of the base supporter is substantially coaxially aligned with a rotational center axis of the turntable when the lock member is connected to the base supporter.

16. The disk changer apparatus according to claim 10, wherein a recess portion is formed on one of the top end of the rotation base and the base supporter, a protrusion operable to fit into the recess portion is formed on the other of the top end of the rotation base and the base supporter, and, when the rotation base rotates to the driving position, the base supporter moves toward the rotation base so that the protrusion fits into the recess portion.

17. The disk changer apparatus according to claim 16, wherein the lock member is operable to move the base supporter toward the rotation base.

18. A disk changer apparatus comprising:
a plurality of disk supporters, each of the disk supporters operable to support a disk, the disk supporters being stacked vertically;
a disk selection mechanism operable to move the plurality of disk supporters vertically and to place one of the disk supporters at a selected position;
a rotation base comprising a turntable and a head, the rotation base being rotatable about the rear end portion thereof;
a driving mechanism operable to rotate the rotation base between a driving position and a standby position, the driving position being a position where one of a center of a disk supported by the disk supporter located at the selected position or a center of a disk pulled out from the disk supporter located at the selected position is aligned with a center of the turntable, the standby position being a position where the rotation base does not overlap the disk supported by the disk supporter;
a lock member movably mounted on the rotation base;
a base supporter opposite a top end of the rotation base when the rotation base moves to the driving position; and
a lock control mechanism operable to interconnect the lock member and the base supporter when the rotation base moves to the driving position;

wherein the base supporter is resiliently supported by a resilient member in a case when the lock member is connected to the base supporter and a disk is rotated by the turntable.

19. The disk changer apparatus according to claim 18, wherein the base supporter is located at a position where the base supporter is capable of passing through the center hole of a disk supported by a disk supporter other than the disk supporter located at the selected position.

20. The disk changer apparatus according to claim 18, wherein the rotation base comprises a thread mechanism operable to reciprocally move the head along a surface of the disk and the lock control mechanism interconnects the lock member and the base supporter or releases the base supporter from the lock member in accordance with the movement of the head.

21. The disk changer apparatus according to claim 20, wherein the lock member is biased by a spring in a direction tending to connect the lock member and the base supporter and, when the head moves in one of the reciprocal directions, the lock member is moved by the head in a direction against the biasing force of the spring tending to release the base supporter from the lock member.

22. The disk changer apparatus according to claim 21, wherein the lock member is mounted on the rotation base such that the lock member is slidably movable in the same moving direction as the head, the lock member comprises a pressing blade extending into a moving area of the head, and the head presses against the pressing blade so as to move the lock member in a direction to release the base supporter.

23. The disk changer apparatus according to claim 18, wherein a center axis of the base supporter is substantially coaxially aligned with a rotational center axis of the turntable when the lock member is connected to the base supporter.

24. The disk changer apparatus according to claim 18, wherein a recess portion is formed on one of the top end of the rotation base and the base supporter, a protrusion operable to fit into the recess portion is formed on the other of the top end of the rotation base and the base supporter, and, when the rotation base rotates to the driving position, the base supporter moves toward the rotation base so that protrusion fits into the recess portion.

25. The disk changer apparatus according to claim 24, wherein the lock member moves the base supporter toward the rotation base in a direction tending to interconnect the lock member with the base supporter.

* * * * *

UNITED STATES PATENT AND TRADEMARK OFFICE
CERTIFICATE OF CORRECTION

PATENT NO. : 7,418,724 B2  Page 1 of 1
APPLICATION NO. : 11/124426
DATED : August 26, 2008
INVENTOR(S) : Tsutomu Tatekawa et al.

It is certified that error appears in the above-identified patent and that said Letters Patent is hereby corrected as shown below:

In column 17, claim 10, line 40, after "of disk" delete "supporters-vertically" and substitute --supporters vertically-- in its place.

Signed and Sealed this

Twelfth Day of May, 2009

JOHN DOLL
*Acting Director of the United States Patent and Trademark Office*